United States Patent
Kobayashi et al.

(10) Patent No.: US 7,903,531 B2
(45) Date of Patent: Mar. 8, 2011

(54) OPTICAL DISK APPARATUS FOR DETECTING TILT OF AN OPTICAL DISK, AND AN OPTICAL DISK FOR TILT DETECTION

(75) Inventors: Yoshiharu Kobayashi, Katano (JP); Yoshihiro Mushika, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1230 days.

(21) Appl. No.: 10/560,810

(22) PCT Filed: Dec. 13, 2004

(86) PCT No.: PCT/JP2004/018578
§ 371 (c)(1),
(2), (4) Date: Dec. 15, 2005

(87) PCT Pub. No.: WO2005/064603
PCT Pub. Date: Jul. 14, 2005

(65) Prior Publication Data
US 2006/0158974 A1      Jul. 20, 2006

(30) Foreign Application Priority Data
Dec. 16, 2003   (JP) .................................. 2003-417774

(51) Int. Cl.
*G11B 7/00*         (2006.01)
(52) U.S. Cl. ............. 369/112.23; 369/44.32; 369/112.29
(58) Field of Classification Search ............... 369/44.32, 369/53.19, 112.23, 112.29
See application file for complete search history.

(56) References Cited

U.S. PATENT DOCUMENTS

| 5,289,407 | A | | 2/1994 | Strickler et al. |
| 5,559,784 | A | * | 9/1996 | Ota .................................. 369/94 |
| 6,009,065 | A | | 12/1999 | Glushko et al. |
| 6,430,137 | B1 | * | 8/2002 | Saimi et al. ................. 369/112.1 |
| 2002/0018435 | A1 | * | 2/2002 | Kim et al. ................. 369/112.15 |
| 2004/0037196 | A1 | * | 2/2004 | Matsumoto et al. ....... 369/53.19 |

(Continued)

FOREIGN PATENT DOCUMENTS

JP          4-366428          12/1992

(Continued)

OTHER PUBLICATIONS 3.2 Disk Design Technology, Matsushita Technical Journal, vol. 45, No. 6, Dec. 1999, pp. 672-678 (along with abstract).

(Continued)

*Primary Examiner* — Wayne R Young
*Assistant Examiner* — Latanya Bibbins
(74) *Attorney, Agent, or Firm* — Wenderoth, Lind & Ponack, L.L.P.

(57) ABSTRACT

The invention provides an optical disk apparatus and an optical disk that are applicable to a multilayer optical disk, and enable tilt detection with a high precision. The optical disk has a transparent planar disk base member, a recording layer formed on the disk base member, and a reflecting layer in a certain positional relation to the recording layer. The optical disk apparatus includes a laser pointer 61 for irradiating a laser beam onto the recording layer of the optical disk by way of the disk base member to form a focusing spot on the recording layer, a photo-sensor array 6G for receiving a reflected beam from the reflecting layer, and an aberration mode detecting circuit 6H for detecting tilt of the optical disk by using an output from the photo-sensor array 6G.

15 Claims, 15 Drawing Sheets

U.S. PATENT DOCUMENTS

| | | |
|---|---|---|
| 2004/0090897 A1 | 5/2004 | Akiyama et al. |
| 2004/0114494 A1* | 6/2004 | Mizuno et al. .......... 369/112.17 |

FOREIGN PATENT DOCUMENTS

| | | | |
|---|---|---|---|
| JP | 7-272299 | | 10/1995 |
| JP | 8-45080 | | 2/1996 |
| JP | 11-232674 | | 8/1999 |
| JP | 11-232677 | | 8/1999 |
| JP | 11232674 A | * | 8/1999 |
| JP | 2000-76678 | | 3/2000 |
| JP | 2001-505701 | | 4/2001 |
| JP | 2002-117550 | | 4/2002 |
| JP | 2003-16680 | | 1/2003 |
| JP | 2003-77158 | | 3/2003 |
| JP | 2003-85818 | | 3/2003 |
| JP | 2003-91846 | | 3/2003 |

OTHER PUBLICATIONS

M. Miyamoto et al., "Analysis to reduce cross erase for phase-change optical disks", The Institute of Electronics, Information and Communication Engineers, Technical Report of IEICE.CPM2000-95 (Sep. 2000), pp. 21-27 (along with abstract).

Mark A. A. Neil et al., "New modal wave-front sensor: a theoretical analysis", J. Opt. Soc. Am. A/vol. 17, No. 6/Jun. 2000, pp. 1098-1107.

Carlos Robledo-Sánchez et al., "Aberration extraction in the Hartmann test by use of spatial filters", Applied Optics, vol. 38, No. 16, Jun. 1, 1999, pp. 3483-3489.

M. A. A. Neil et al., "Closed-loop aberration correction by use of a modal Zernike wave-front sensor", Optics Letters, Aug. 1, 2000, vol. 25, No. 15, pp. 1083-1085.

Mark A. A. Neil et al., "Active aberration correction for the writing of three-dimensional optical memory devices", Applied Optics, vol. 41, No. 7, Mar. 1, 2002, pp. 1374-1379.

Japanese Office Action (with English translation) issued May 19, 2009 in connection with corresponding Japanese Patent Application No. 2005-516560.

* cited by examiner

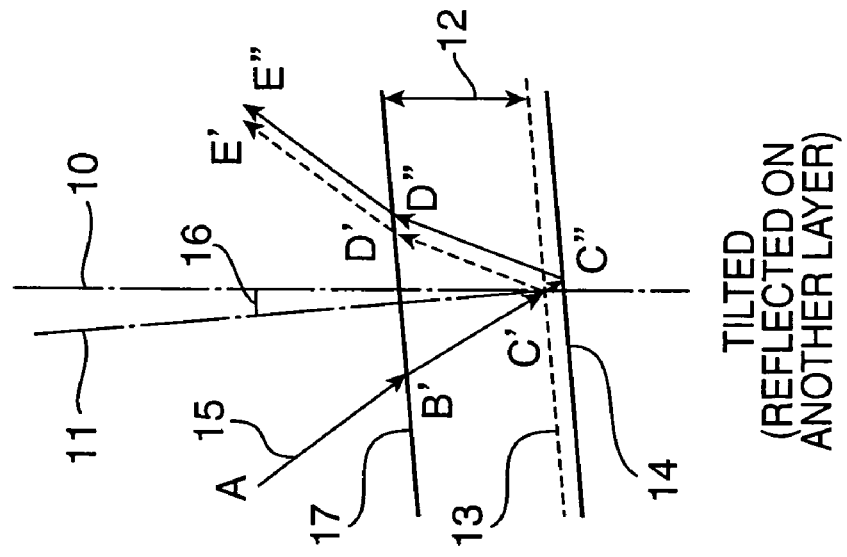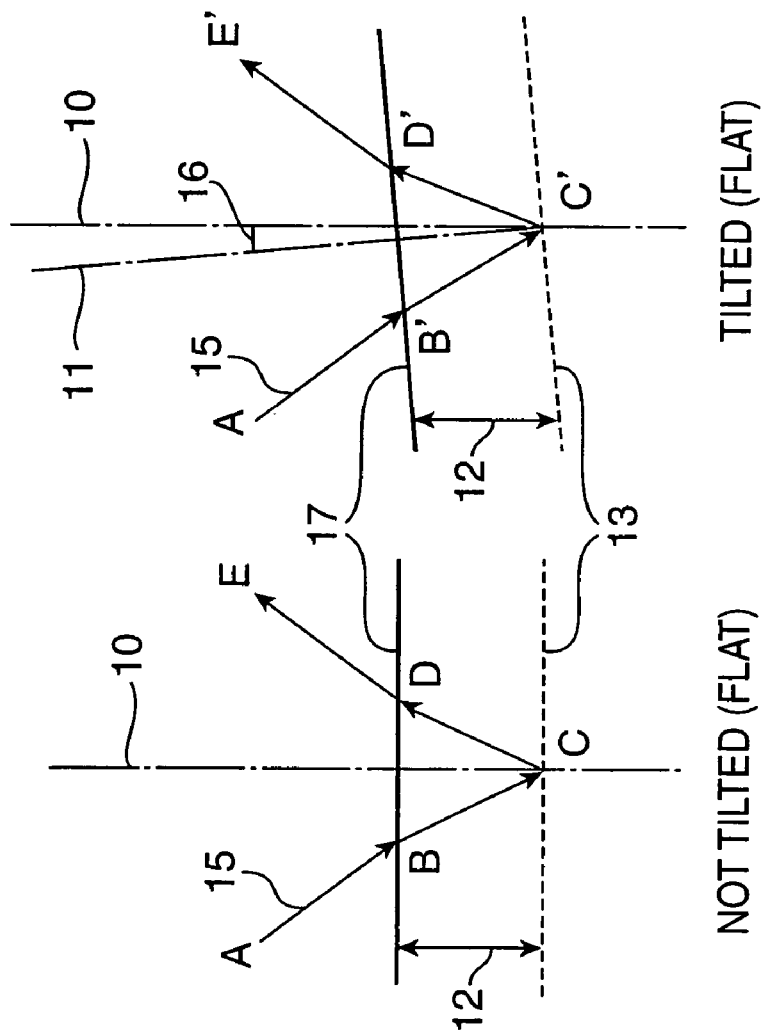

TILTED
(DETECT TRANSMITTED BEAM)

TILTED
(INCOMING BEAM WITH SMALL
NUMERICAL APERTURE)

INCOMING BEAM AND OUTGOING BEAM
VIEWED FROM OPTICAL AXIS DIRECTION

OPTICAL DISK APPARATUS FOR DETECTING TILT OF AN OPTICAL DISK, AND AN OPTICAL DISK FOR TILT DETECTION

TECHNICAL FIELD

The present invention relates to an optical information recording medium such as an optical disk, an optical disk apparatus for recording or reproducing optical information on or from an optical information recording medium, and an optical disk.

BACKGROUND ART

It is effective to increase the numerical aperture of an objective lens and to shorten a laser wavelength in order to maximize the capacity of an optical disk. Also, in recent years, the development of a multilayer recordable optical disk has progressed. In multilayer recording, it is important to keep a laser beam from attenuating due to absorption or dispersion of the laser beam on a recording layer formed between a disk base member and a target recording layer in irradiating the laser beam onto the target recording layer via the disk base member. In view of this, there is proposed a technique of reducing unnecessary absorption and dispersion of a laser beam on a site other than a focusing spot by utilizing a nonlinear optical effect such as two-photon absorption.

Aberration by tilt is one of the drawbacks involved in maximizing the capacity of an optical disk. The word "tilt", as used throughout the specification and the claims, means tilt of an optical axis of a laser beam with respect to a normal line to a surface of a substrate of an optical disk. If the numerical aperture of an objective lens is increased, and the laser wavelength is shortened, an influence of aberration due to tilt of an optical disk is increased. In some cases, a substantial thickness of a disk base member is increased if recording is attempted onto a layer proximate to the bottom of the optical disk in multilayer recording, with the result that an influence of aberration by tilt is significantly large. Such an aberration fails to obtain a clear focusing spot, and lowers reliability in recording/reproducing. Accordingly, in recording information of a large capacity onto an optical disk, it is essentially important to accurately detect tilt of the optical disk.

Aberration by tilt includes odd symmetrical aberration such as coma aberration and astigmatism. The following fact is known in an optical system of forming a focusing spot on a flat disk substrate such as an optical disk: if aberration has occurred in an incoming optical path, such an aberration may be cancelled in an outgoing optical path. Therefore, it is impossible to detect tilt of the optical disk simply by measuring aberration of a reflected beam from the focusing spot. This is one of the problems to be solved in tilt detection.

A first example of the conventional tilt detection is disclosed, for instance, in Japanese Unexamined Patent Publication No. 11-232677 (called as "D1"). In this example, after a signal from a detector is divided into two components in tangential directions of an optical disk, the signal components are differentially amplified to generate a tangential push-pull signal. Front and rear edge portions of a mark on a recording layer are detected with use of the tangential push-pull signal. Tilt of the optical disk in the tangential directions is detected based on a symmetrical property of a crest value of the tangential push-pull signal at the front and rear edge portions of the mark. In D1, similarly to the tangential push-pull signal, a radial push-pull signal is generated in radial directions of the optical disk, and tilt of the optical disk in radial directions is detected based on a symmetrical property of the radial push-pull signal at the front and rear edge portions of the mark.

A second example of the conventional tilt detection is disclosed, for instance, in Japanese Unexamined Patent Publication No. 2003-77158 (called as "D2"). D2 discloses a simpler method of detecting tilt of an optical disk in tangential directions. According to this method, a reproduction signal is inputted to a differentiating circuit, an output from the differentiating circuit is compared with a predetermined level by a comparator circuit, and a pulse width of the output from the comparator circuit is measured to perform tilt detection. Similarly to the first example, in the second example, front and rear edge portions of a mark on a recording layer are detected, and tilt of an optical disk is detected based on a symmetrical property regarding the front and rear edge portions.

A third example of the conventional tilt detection is disclosed, for instance, in Japanese Unexamined Patent Publication No. 2003-16680 (called as "D3"). In D3, tilt is detected in the following manner. A defocused state is created by adding an offset component to a focus control signal through application of an offset voltage to a defocus detection signal when an objective lens is focused. A tracking error signal detected in the defocused state is extracted as a tilt signal in a radial direction of an optical disk.

The aforementioned conventional optical disks and optical disk apparatuses have suffered from the following drawbacks.

In the first and the second conventional examples, a groove or a pit is required to be formed in tilt detection. If the techniques disclosed in D1 and D2 are applied to multilayer recording, diffraction or dispersion may occur due to the existence of the groove or the pit formed in each of the recording layers, which may unduly reduce the light amount to be received on the optical disk.

Further, in these conventional tilt detections, when an optical disk is tilted, a side robe is generated in skirt portions in a tilted direction of a beam spot and in a direction opposite to the tilted direction. The conventional techniques utilize a phenomenon that a crest value of a differentiated waveform of a push-pull signal or a reproduction signal is decreased due to generation of the side robes.

When the tilt angle is small, the magnification of the side robe is small. Accordingly, sufficient tilt detection sensitivity in a tangential direction of an optical disk cannot be expected. Also, since a laser beam does not propagate in a radial direction of an optical disk, tilt detection sensitivity in the radial direction is smaller than that in the tangential direction. Therefore, the S/N ratio of a detection output concerning the tilt detection is significantly small, which resultantly leads to a low precision in tilt detection.

The third conventional example has a drawback that recording/reproducing is impossible while the optical disk is in a defocused state. It takes quite a long time to create a defocused state by moving an objective lens for tilt detection, move the objective lens again to focus onto a target recording layer, and to read an address from the recording layer to confirm that the objective lens has returned to the target recording layer. This arrangement lacks real-time responsiveness in tilt detection.

DISCLOSURE OF THE INVENTION

In view of the above problems present in the prior art, it is an object of the invention to provide an optical disk apparatus that is compatible with a multilayer optical disk, and is capable of performing tilt detection of a high precision, and an optical disk.

To solve the above problems, an optical disk apparatus according to an aspect of the invention comprises: a light source which irradiates a laser beam onto a recording layer of an optical disk by way of a disk base member to form a focusing spot on the recording layer, the optical disk having the transparent planar disk base member, the recording layer formed on the disk base member, and a reflecting layer in a certain positional relation to the recording layer; a photo detector which receives a reflected beam from the reflecting layer; and a tilt detecting means which detects tilt of the optical disk by using an output from the photo detector.

In the above arrangement, the reflecting layer parallel to the recording layer on which the laser beam is focused is formed, and tilt of the recording layer is indirectly detected by using the reflected beam from the reflecting layer. Since the reflected beam from the reflecting layer is defocused, tilt aberration and coma aberration are not cancelled. Forming the reflecting layer on the optical path enables to keep detection sensitivity in tilt detection from lowering due to offset of aberration of the laser beam between the incoming beam and the outgoing beam, thereby enabling to perform tilt detection of a high precision. Also, this arrangement enables to detect tilt of the optical disk without forming a groove or a pit in the recording layer of the optical disk, which is advantageous in effectively suppressing lowering of the light amount to be received on the optical disk due to diffraction or dispersion of the laser beam on a recording layer other than the target recording layer in multilayer recording where recording is executed with respect to multiple recording layers.

These and other objects, features, aspects, and advantages of the present invention will become more apparent upon reading of the following detailed description and accompanying drawings.

BRIEF DESCRIPTION OF THE DRAWINGS

FIGS. 1A through 1C are illustrations for explaining a principle of tilt detection in a first embodiment of the invention.

DETAILED DESCRIPTION OF THE INVENTION

Figure 2:
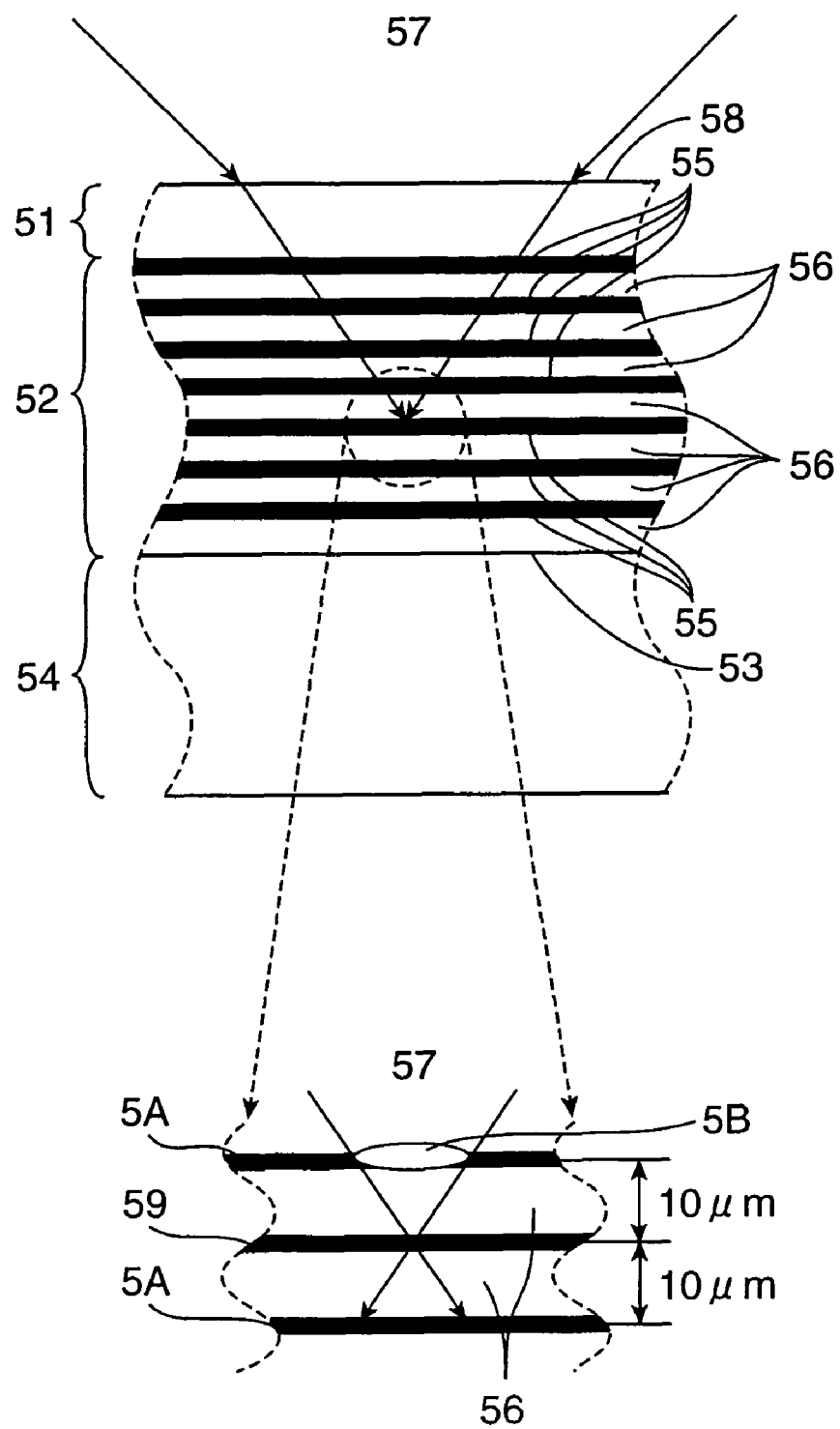
FIG. 2 is a cross-sectional view showing an optical disk in the first embodiment.

In the following, an optical disk apparatus and an optical disk embodying the present invention are described referring to the drawings.

First Embodiment

FIGS. 1A through 1C are illustrations for explaining a principle of tilt detection in the first embodiment. Although FIGS. 1A through 1C show an example that an optical disk has a single recording layer for sake of easy explanation, the same principle is applied to a case that an optical disk has plural recording layers. FIG. 1A is an illustration showing an optical path of laser light (laser beam) when an optical disk is not tilted. As shown in FIG. 1A, the laser beam incident through a base member 12 of an optical disk by way of a surface 17 thereof is reflected from a recording layer 13. In other words, the incident laser beam forms an optical path 15 passing the points A, B, C, D, and E. FIG. 1B shows a state that the optical disk shown in FIG. 1A is tilted. In FIG. 1B, an optical axis 10 of the laser beam is tilted with respect to a normal line 11 to the recording layer 13 by a certain angle 16. The angle 16 corresponds to a tilt angle. The optical path 15 shown in FIG. 1B passes the points A, B', C', D' and, E'. Since the length of the optical path 15 is the same between the case that the optical disk is not tilted and the case that the optical disk is tilted, tilt of the optical disk cannot be detected with use of the reflected laser beam. In this embodiment, as shown in FIG. 1C, a reflecting layer 14 parallel to the recording layer 13 is formed, and a laser beam is allowed to propagate through the recording layer 13 by adjusting the transmittance of the recording layer 13 to perform tilt detection using the laser beam reflected from the reflecting layer 14. In FIG. 1C, similarly to FIG. 1B, the length of the optical path 15 passing the points A, B', C', D', and E' is the same as that of the optical path 15 passing the points A, B, C, D, and E in FIG. 1A. However, the length of the optical path 15 passing the points A, B', C', C", D", and E" in FIG. 1C is obviously different from the length of the optical path 15 passing the points A, B', C', D', and E' shown in FIG. 1B. Therefore, applying the idea shown in FIG. 1C enables to detect tilt aberration and coma aberration by using the reflected beam without cancellation of these aberrations due to increase/decrease in optical path length between the incoming optical path and the outgoing optical path.

FIG. 2 is an illustration showing a cross section of a multilayer optical disk in the first embodiment. The optical disk has an upper base member 51, a recording layer stack 52, a reflecting layer 53, and a lower base member 54. The recording layer stack corresponds to a portion where a number of recording layers 55 are formed one over the other via an intermediate layer 56. The respective recording layers 55 in the recording layer stack 52 are formed parallel to the reflecting layer 53. These parallel layers are formed, for instance, by forming one intermediate layer 56 on the reflecting layer 53 by spin coat or sputtering, and by forming a recording layer 55 and then another intermediate layer 56 by spin coat or sputtering. Thus, the recording layers 55 and the reflecting layer 53 are formed parallel to each other.

The gap between the adjoining recording layers 55, namely, the thickness of each intermediate layer 56 is e.g. 10 μm. The thickness of the intermediate layer 56 is determined by the number of data recorded in a circle 5B, which is defined by laser beams 57 propagating in a crisscross manner through an adjoining recording layer 5A adjoining a target recording layer 59 on which the laser beams 57 are focused. This is for the following reason. A change of the numerals "1" and "0", which are recording codes representing the data recorded in the circle 5B, is read as a crosstalk noise. As the number of data recorded in the circle 5B is increased, the change is averaged. Accordingly, a predetermined allowable crosstalk noise determines the number of data recorded in the circle 5B, and the number of data recorded in the circle 5B determines the gap between the adjoining recording layers 55, namely, the thickness of the intermediate layer 56. Preferably, the intermediate layer 56 formed between the lowermost layer of the recording layer stack 52 and the reflecting layer 53 is 10 μm or less e.g. about 3 μm, because there is no data recorded on the reflecting layer 53.

A reflecting layer used with a recording layer in a conventional optical disk serves as a light reflecting layer for allowing a laser beam to be irradiated onto the recording layer a number of times, and as a heat diffusing layer for readily diffusing heat generated on the recording layer. In view of this, the recording layer and the reflecting layer are formed proximate to each other, so that a laser beam reflected from the reflecting layer is efficiently irradiated onto the recording layer, or heat generated on the recording layer is efficiently diffused by the reflecting layer (see Matsushita Technical Journal Vol. 45 No. 6 December 1999 pp. 672-678, Section 3.2 "Disk Design Technology").

In the case that an optical disk is a phase change disk such as a DVD-RAM disk, the gap between the recording layer and the reflecting layer is about 20 nm to about 200 nm (see Technical Report of IEICE CPM2000-95 2000.09 pp. 21-27, Section No. 4: Computation Result).

On the other hand, the reflecting layer 53 of the optical disk in this embodiment is formed to reflect a laser beam that has been focused on the recording layer 55 and has been defocused on the reflecting layer 53. In other words, a certain degree of defocusing is required. Unless otherwise, tilt aberration or coma aberration in the reflected laser beam may be cancelled in the outgoing optical path, thereby lowering detection sensitivity in tilt detection.

In view of the above, it is necessary, in this embodiment, to set the gap between the recording layer 53 (sic) and the reflecting layer 55 (sic), namely, the thickness of the intermediate layer 56 to be formed between the recording layer 53 (sic) and the reflecting layer 55 (sic) sufficiently larger than the wavelength of a laser beam. For instance, in the case where a laser beam of a wavelength of 660 nm is used, the gap between the recording layer 53 (sic) and the reflecting layer 55 (sic) is required to be set five times as large as the wavelength of the laser beam, namely, about 3,000 nm (3 μm) or more.

As mentioned above, the gap between the recording layer and the reflecting layer in the embodiment of the invention is about several ten times to several hundred times as large as that in the conventional optical disk, and the constructions of the optical disks in the embodiment and in the conventional art are different from each other accordingly.

A photochromic material such as diarylethene or fulgide is used for forming the recording layers 55. A UV curing resin, ZnS—SiO$_2$ or a like material is used for forming the intermediate layers 56, for instance. A silicon thin film or a metallic thin film made of aluminum or a like material is used as the reflecting layer 53, for instance.

It is possible to form the recording layers 55 of a photoisomerizing material having a property that two-photon absorption occurs by irradiation of laser beam. Two-photon absorption is one of nonlinear optical effects, wherein a molecule of a material simultaneously absorbs two photons, thereby changing a refractive index or a like factor of the material. The refractive index of a focusing spot on an optical disk made of the photoisomerizing material where a laser beam is to be focused can be changed by utilizing the two-photon absorption. In a multilayer optical disk, a target recording layer for which recording is performed can be selected by controlling the focal point of a laser beam in a depthwise direction of the optical disk. An example of the photoisomerizing material is diarylethene.

Figure 3:
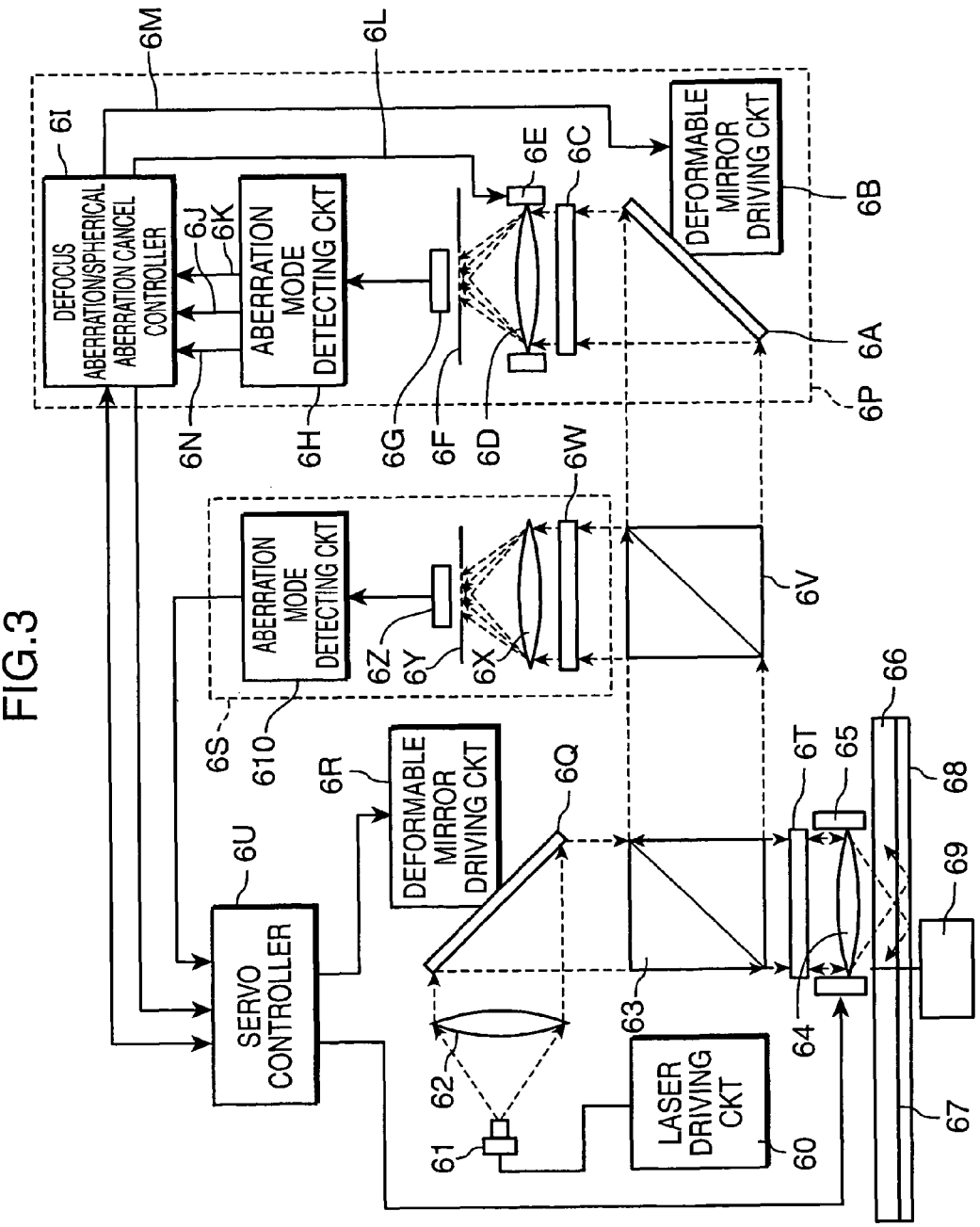
FIG. 3 is an illustration showing an arrangement of an optical disk apparatus in the first embodiment.

FIG. 3 is an illustration showing an arrangement of an optical disk apparatus in the first embodiment. An optical disk 66 is the multilayer optical disk shown in FIG. 2. A laser pointer (light source) 61 is driven by a laser driving circuit 60 to output a laser beam of a certain power. The laser beam outputted from the laser pointer 61 is converted into parallel rays by a collimator lens 62.

Spherical aberration of the parallel rays of the laser beam is corrected by a deformable mirror 6Q. A correction amount of the spherical aberration to be carried out by the deformable mirror 6Q is determined in such a manner as to minimize a spherical aberration amount in a laser beam reflected from the recording layer 59 on which the laser beams 57 are focused through the recording layer stack 52 in FIG. 2. The spherical aberration amount in the reflected laser beam from the recording layer 59 is detected by an even symmetrical aberration sensor 6S. The even symmetrical aberration sensor 6S is a sensor for outputting an aberration amount of modal aberration of an even order in a Zernike mode such as defocus aberration and spherical aberration, for instance. The spherical aberration output from the even symmetrical aberration sensor 6S is temporarily inputted to a servo controller 6U. The servo controller 6U drives the deformable mirror 6Q by way of a deformable mirror driving circuit 6R based on the spherical aberration amount detected by the even symmetrical aberration sensor 6S.

The laser beam reflected from the deformable mirror 6Q is incident onto an objective lens 64 after passing through a deflecting beam splitter 63 and a quarter (¼) wavelength plate 6T. The servo controller 6U controls an objective lens actuator 65 based on the defocus aberration amount outputted from the even symmetrical aberration sensor 6S to move the objective lens 64 in such a manner that the laser beam is focused onto a target recording layer in a recording layer stack 67.

A part of the laser beam that has reached the target recording layer in the recording layer stack 67 reaches a reflecting layer 68 through the recording layer stack 67. The other part of the laser beam that has reached the target recording layer in the recording layer stack 67 is reflected from the target recording layer in the recording layer stack 67. The reflecting layer 68 is made parallel to the recording layers in the recording layer stack 67. The laser beam that has reached the reflecting layer 68 is reflected thereon and is returned to the objective lens 64. The laser beam that has returned to the objective lens 64 is passed through the objective lens 64 and the quarter wavelength plate 6T, is reflected from the deflecting beam splitter 63 in a direction different from the direction of the incoming beam, and is incident onto a half mirror 6V. The laser beam incident onto the half mirror 6V is split into two laser beams by the half mirror 6V. One of the laser beams split on the half mirror 6V, namely, the laser beam propagating through the half mirror 6V is incident onto the interior of a tilt sensor 6P indicated by the dotted line block in FIG. 3. The other of the laser beams split on the half mirror 6V, namely, the laser beam reflected from the half mirror 6V is incident onto the interior of the even symmetrical aberration sensor 6S indicated by the dotted line block in FIG. 3.

The tilt sensor 6P is an improved sensor of a conventional well-known modal wavefront sensor. A modal wavefront sensor is a wavefront sensor for outputting a wavefront in terms of coefficients in an orthogonal aberration mode such as a Zernike mode. The modal wavefront sensor has a feature that an aberration amount of a predetermined aberration mode is detectable irrespective of an aberration amount of the other aberration mode. The modal wavefront sensor can detect an aberration amount of coma aberration, which is one of the aberration modes, independently of the other aberration modes e.g. spherical aberration. In this arrangement, tilt of an optical disk can be detected by detecting tilt aberration or coma aberration with use of the modal wavefront sensor.

A modal wavefront sensor based on which the embodiment of the invention has been made is recited in New modal wave-front sensor: a theoretical analysis, J. Opt. Soc. Am. A/Vol. 17, No. 8 (sic), pp. 1098-1107/June 2000 by Mark A. A., Tony Wilson, et al.

The modal wavefront sensor recited in the above document and the tilt sensor 6P in this embodiment are different in the arrangement that the latter is additionally provided with a mechanism for canceling defocus aberration and spherical aberration of a laser beam incident onto the tilt sensor 6P. The mechanism for canceling defocus aberration is realized by making a condenser lens 6D movable. The mechanism for canceling spherical aberration is realized by providing a deformable mirror 6A.

The laser beam incident on the tilt sensor 6P is incident onto the deformable mirror 6A. The deformable mirror 6A has its mirror configuration changed depending on an inputted spherical aberration control signal 6M. As mentioned above, spherical aberration is canceled by the deformable mirror 6A.

The laser beam reflected from the deformable mirror 6A is incident onto a hologram 6C. Eight kinds of bias aberrations, namely, two kinds of bias X coma aberrations which are different in sign and identical in size, two kinds of bias Y coma aberrations which are different in sign and identical in size, two kinds of bias defocus aberrations which are different in sign and identical in size, and two kinds of bias spherical aberrations which are different in sign and identical in size are added to the incident laser beam in the hologram 6C. The aberration amounts of the respective bias aberrations are determined by the detected aberration amounts, and preferably set to about half of the respective detected aberration amounts.

The laser beam added with the respective bias aberrations in the hologram 6C is incident onto the condenser lens 6D. The condenser lens 6D is supported by a condenser lens actuator 6E. The condenser lens actuator 6E moves the focus position of the condenser lens 6D depending on a defocus aberration control signal 6L. As mentioned above, defocus aberration is canceled by moving the condenser lens 6D.

The laser beam incident onto the condenser lens 6D is focused on a pinhole plate 6F. Eight pinholes are formed in the pinhole plate 6F in correspondence to the number of the added bias aberrations. The radius of each of the pinholes is for instance 1/1.22 times as large as the radius of an airy disk.

The laser beams that have passed through the pinholes in the pinhole plate 6F are incident onto photo-sensors of a photo-sensor array 6G arrayed in correspondence to the pinholes, respectively. The laser beams incident onto the respective photo-sensors are converted into electrical signals, which are outputted to an aberration mode detecting circuit 6H. A signal from each of the photo-sensors is differentially amplified in the aberration mode detecting circuit 6H with respect to each of the aberration modes. Specifically, the aberration mode detecting circuit 6H outputs X-,Y-tilt detection signals 6N (X-,Y-coma aberration detection signals), a defocus aberration detection signal 6J, and a spherical aberration detection signal 6K. The X-,Y-tilt detection signals 6N (X-,Y-coma aberration detection signals) constitute an output from the tilt sensor 6P.

The defocus aberration detection signal 6J, the spherical aberration detection signal 6K, and the X-,Y-tilt detection signals 6N are outputted to a defocus aberration/spherical aberration cancel controller 6I. The defocus aberration/spherical aberration cancel controller 6I generates the defocus aberration control signal 6L and the spherical aberration control signal 6M based on the defocus aberration detection signal 6J and on the spherical aberration detection signal 6K in such a manner as to cancel defocus aberration of the laser beam incident onto the condenser lens 6D and to cancel spherical aberration of the laser beam incident onto the deformable mirror 6A, and outputs the defocus aberration control signal 6L and the spherical aberration control signal 6M to the defocus aberration/spherical aberration cancel controller 6I. Simultaneously, the defocus aberration detection signal 6J, the spherical aberration detection signal 6K, and the X-,Y-tilt detection signals 6N are outputted to the servo controller 6U. The servo controller 6U and the defocus aberration/spherical aberration cancel controller 6I are communicated to each other by an interactive communication line.

The tilt sensor 6P having the above arrangement has the following features, as compared with the modal wavefront sensor recited in the above document.

Coma aberration in the laser beam reflected from the reflecting layer 68 is not canceled, and remains therein. Theoretically, tilt of the optical disk is detectable by using the coma aberration. However, defocus aberration and spherical aberration, which are significantly large aberrations, also remain in the reflected laser beam, as well as the coma aberration. Accordingly, if the modal wavefront sensor recited in the document is used, a clear beam spot is not formed even with use of the condenser lens 6D, with the result that a detection output may be unduly reduced.

On the other hand, in the case where the tilt sensor 6P is used, after defocus aberration and spherical aberration of the laser beam incident onto the tilt sensor 6P are canceled, the laser beam is incident onto the condenser lens 6D. This arrangement enables to obtain a clear beam spot with a sufficiently large Strehl ratio and to obtain X-,Y-tilt detection signals 6N with a high S/N ratio, namely, with a large detection output.

Now, an arrangement of the even symmetrical aberration sensor 6S is described.

The laser beam reflected from the target recording layer in the recording layer stack 67 is returned to the objective lens 64. The laser beam that has returned from the target recording layer to the objective lens 64 is passed through the objective lens 64 and the quarter wavelength plate 6T, is reflected from the deflecting beam splitter 63 in a direction different from the direction of the incoming beam, and is incident onto the half mirror 6V. The laser beam incident onto the half mirror 6V is split into two laser beams by the half mirror 6V. One of the laser beams is incident onto the interior of the tilt sensor 6P indicated by the dotted line block in FIG. 3, and the other of the laser beams is incident onto the interior of the even symmetrical aberration sensor 6S indicated by the dotted line block in FIG. 3.

The even symmetrical aberration sensor 6S detects defocus aberration and spherical aberration of the laser beam that has been focused on the target recording layer in the recording layer stack 67 and reflected thereon. Unlike the laser beam detected by the tilt sensor 6P, the laser beam detected by the even symmetrical aberration sensor 6S does not include a large defocus aberration or a large spherical aberration. Therefore, there is no need of canceling defocus aberration or spherical aberration of the laser beam detected by the even symmetrical aberration sensor 6S. In this sense, the even symmetrical aberration sensor 6S is equivalent to the modal wavefront sensor recited in the document.

The laser beam incident onto the even symmetrical aberration sensor 6S is incident onto a hologram 6W. Four kinds of bias aberrations, namely, two kinds of bias defocus aberrations which are different in sign and identical in size, and two kinds of bias spherical aberrations which are different in sign and identical in size, are added to the incident laser beam in the hologram 6W. Aberration amounts of the respective bias aberrations are determined by the detected aberration amounts, and preferably set to about half of the respective detected aberration amounts.

The laser beam added with the respective bias aberrations in the hologram 6W is incident onto a condenser lens 6X. The position of the condenser lens 6X is adjusted in such a manner that the laser beam from the focusing spot of the objective lens 64 is focused.

The laser beam incident onto the condenser lens 6X is focused on a pinhole plate 6Y. Four pinholes are formed in the pinhole plate 6Y in correspondence to the number of the added bias aberrations. The radius of each of the pinholes is for instance about 1/1.22 times as large as the radius of an airy disk.

The laser beams that have passed through the pinholes in the pinhole plate 6Y are incident onto photo-sensors of a photo-sensor array 6Z arrayed in correspondence to the pinholes, respectively. The photo-sensors convert the incident laser beams into electrical signals, which are outputted to an aberration mode detecting circuit 6I0. A signal from each of the photo-sensors is differentially amplified in the aberration mode detecting circuit 6I0 with respect to each of the aberration modes. The aberration mode detecting circuit 6I0 outputs a defocus aberration signal and a spherical aberration signal to the servo controller 6U.

A reproduction signal for reproducing recorded data is obtained by adding aberration signals of the same kind with different signs within the signals outputted from the photo-sensors in the tilt sensor 6P and in the even symmetrical aberration sensor 6S. For instance, a reproduction signal is obtained by adding a signal from the photo-detector which has undergone bias addition of a plus sign with respect to defocus aberration in the even symmetrical aberration sensor 6S, and a signal from the photo-detector which has undergone bias addition of a minus sign with respect to defocus aberration. Also, a reproduction signal with a high S/N ratio is obtained by adding signals from plural sets of photo-detectors in place of adding signals from one set of photo-detectors.

Now, an operation of the optical disk apparatus in this embodiment is described. In an initial state of the optical disk apparatus such as turning on of the power of the apparatus, the servo controller 6U controls the objective lens actuator 65 to move the objective lens 64 in such a manner that a laser beam is focused on a target recording layer in the recording layer stack 67. An example of a control procedure from the initial state of the optical disk apparatus until a tilt detection signal is outputted is described as follows.

(1) The objective lens actuator 65 temporarily moves the objective lens 64 to such a position that a laser beam is substantially focused on the surface of the optical disk 66.

(2) The defocus aberration/spherical aberration cancel controller 6I drives the condenser lens actuator 6E to adjust the position of the condenser lens 6D of the tilt sensor 6P in such a manner that an "S-shaped curve" is detected based on the defocus aberration detection signal 6J with use of the laser beam reflected from the surface of the optical disk 66. At the same time, the servo controller 6U controls the objective lens 64 in such a manner that an "S-shaped curve" is detected based on the defocus aberration output from the even symmetrical aberration sensor 6S, and that the laser beam is focused onto the surface of the optical disk 66. At this time, spherical aberration is corrected with respect to the surface of the optical disk 66 in such a manner that correction amounts of spherical aberration are identical to each other between the deformable mirror 6A and the deformable mirror 6Q.

(3) When the "S-shaped curve" is detected based on the defocus aberration output from the even symmetrical aberration sensor and the defocus aberration detection signal 6J using the laser beam reflected from the surface of the optical disk 66, the servo controller 6U moves the focusing spot of the laser beam in a downward direction from the surface of the optical disk 66 by moving the objective lens 64. The servo controller 6U controls the deformable mirror 6A, the deformable mirror 6Q, and the condenser lens 6D of the tilt sensor 6P in such a manner that the "S-shaped curve" can be successively detected with respect to a next target recording layer. In this way, the servo controller 6U detects the "S-shaped curve" with respect to a target recording layer in the recording layer stack 67 one after another while counting the number of detection of the "S-shaped curve" with respect to these recording layers.

(4) When the "S-shaped curve" with respect to the target recording layer in the recording layer stack 67 is detected, the servo controller 6U controls the objective lens 64 and the deformable mirror 6Q in such a manner that the laser beam is focused on the target recording layer in the recording layer stack 67, and controls the objective lens 64 and the deformable mirror 6Q in such a manner that the defocus aberration output and the spherical aberration output from the even symmetrical aberration sensor 6S are cancelled. Also, the defocus aberration/spherical aberration cancel controller 6I moves the condenser lens 6D of the tilt sensor 6P in the same direction as mentioned in (3). The defocus aberration/spherical aberration cancel controller 6I controls the deformable mirror 6A in such a manner that the spherical aberration signal 6K detected by the aberration mode detecting circuit 6H is canceled. Thus, the servo controller 6U detects the "S-shaped curve with respect to the reflecting layer 68" while counting the number of detection of the "S-shaped curve with respect to the recording layers" one after another by implementing the aforementioned operations.

(5) When the "S-shaped curve with respect to the reflecting layer 68" is detected, the defocus aberration/spherical aberration cancel controller 6I controls the deformable mirror 6A and the condenser lens 6D in such a manner that the focusing spot regarding the "S-shaped curve with respect to the reflecting layer 68" using the defocus aberration detection signal 6J is controllable. Thus, tilt of the target recording layer in the recording layer stack 67 is detected based on the X-, Y-tilt detection signals 6N outputted from the aberration mode detecting circuit 6H.

After the operation (5), the servo controller 6U detects the "S-shaped curve" with respect to the target recording layer in the recording layer stack 67 based on the defocus aberration output from the even symmetrical aberration sensor 6S, detects the "S-shaped curve" with respect to the target recording layer in the recording layer stack 67 based on the spherical aberration output from the even symmetrical aberration sensor 6S, and controls the objective lens 64 and the deformable mirror 6Q in such a manner that the laser beam is focused on the target recording layer in the recording layer stack 67. Simultaneously, the defocus aberration/spherical aberration cancel controller 6I controls the deformable mirror 6A and the condenser lens 6D in such a manner that the focusing spot regarding the "S-shaped curve with respect to the reflecting layer 68" using the defocus aberration detection signal 6J is controllable. The servo controller 6U controls the objective lens actuator 65 to detect tilt of the target recording layer in the recording layer stack 67 based on the X-,Y-tilt detection signals 6N obtained at that time.

In the above example of the operation, both the detection signals from the tilt sensor 6P and from the even symmetrical aberration sensor 6S are used. Alternatively, it is possible to use the tilt sensor 6P in a time-sharing manner without using the even symmetrical aberration sensor 6S and to perform an initial operation of tilt detection merely by the tilt sensor 6P.

In this embodiment, tilt of the target recording layer on which the laser beam is focused within the recording layer stack 67 is detected by detecting tilt aberration or coma aberration of the reflected laser beam from the reflecting layer 68. Alternatively, it is possible to perform tilt detection by detecting tilt aberration or coma aberration of a laser beam reflected from a recording layer other than the target recording layer on which the laser beam is focused.

In a case that both of the tilt aberration and the coma aberration are detected, if lens shift has not occurred, the sign of the tilt aberration and the sign of the coma aberration are different from each other, whereas the sign of the tilt aberration and the sign of the coma aberration are identical to each other if lens shift has occurred. In view of this, the servo controller 6U controls the objective lens actuator 65 in such a manner that the signs of the tilt aberration and of the coma aberration are identical to each other to eliminate lens shift.

A sensor utilizing the idea of a Hartmann sensor or an equivalent sensor is proposed as another example of the modal sensor. A Hartmann sensor can detect a wavefront configuration in terms of a detection value, and can calculate an aberration amount with respect to each of the aberration modes by expanding the detected wavefront configuration using orthogonal Zernike circle polynomials (see Applied Optics/Vol. 38, No. 16/1 Jun. 1999 Aberration extraction in the Harmann test by use of spatial filters by Carios Robledo-Sanchez). A similar operation can be carried out by a sensor capable of detecting a wavefront configuration such as a lateral share interfering sensor.

In the optical disk apparatus having the above arrangement, since tilt detection is performed by using the laser beam reflected from the reflecting layer parallel to the recording layer, there is no need of forming a groove or the like in a recording layer to diffract the laser beam. This arrangement enables to perform tilt detection with a high precision even if the recording layer is flat.

In this section, described is a difference between tilt detection according to the embodiment of the invention and tilt detection according to the conventional art. In D1, similarly to the embodiment, tilt detection is performed by using a laser beam near a defocused beam spot. In D1, a laser beam on the recording layer is defocused by applying an offset voltage to a focus control signal, and tilt detection is performed by using the defocused reflected beam. On the other hand, in the embodiment, the reflecting layer 53 is formed away from the recording layer 55 by a certain distance, and the laser beam that has been focused on the recording layer 55 and has been reflected from the reflecting layer 53 is detected to perform tilt detection. According to the embodiment, since the laser beam is focused on the recording layer 55, tilt detection and recording/reproducing can be carried out simultaneously.

In D1, however, since the laser beam is not focused on the recording layer, it is impossible to perform recording or reproducing during tilt detection. Generally, it takes a time in millisecond unit to defocus a laser beam on a target recording layer and then to focus the defocused laser beam on the target recording layer, as implemented in D1. In this arrangement, it is difficult to perform tilt detection with respect to each sector.

On the other hand, according to the tilt detection in the embodiment, since a laser beam is constantly focused on a target recording layer, it is possible to perform tilt detection simultaneously with recording information on or reproducing information from the recording layer on a real-time basis. The embodiment enables to perform tilt detection with respect to each sector, for instance.

Also, if a laser beam is defocused on a target recording layer prior to focusing, as implemented in D1, the size of a beam spot is equivalently increased. As a result, a crest value of a tracking error signal e.g. a tracking signal of a push-pull type is lowered, which may cause unstable tracking. In view of this, tilt detection cannot be performed for a long time according to the technique recited in D1.

On the other hand, according to the tilt detection in the embodiment, since a laser beam is constantly focused on a target recording layer, stable tracking can be carried out, and accordingly, tilt detection can be performed for a long time.

For the foregoing reasons, the embodiment of the invention enables to perform tilt detection on a real-time basis, and to simultaneously perform tilt detection and recording/reproducing, which is not executable in D1.

Second Embodiment

Next, a second embodiment of the invention is described referring to the drawings.

Figure 4:
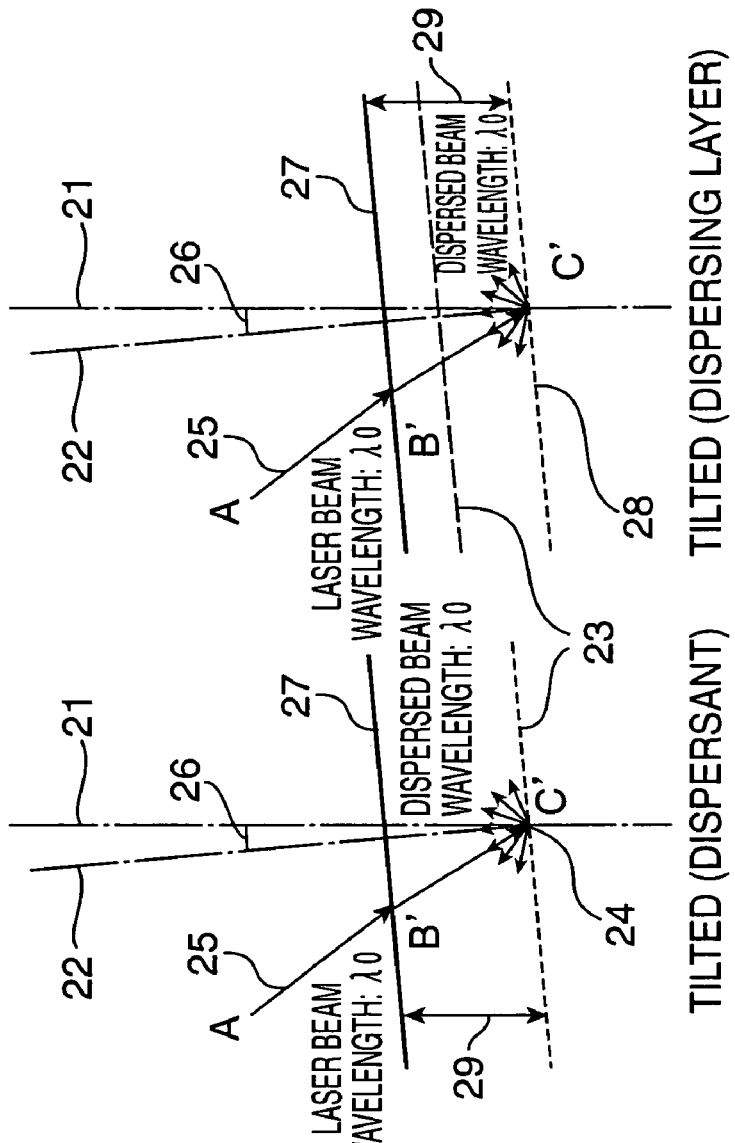
FIGS. 4A through 4C are illustrations for explaining a principle of tilt detection in a second embodiment of the invention.

FIGS. 4A through 4C are illustrations for explaining a principle of tilt detection in the second embodiment. Although FIGS. 4A through 4C show an example that an optical disk has a single recording layer for sake of easy explanation, the same principle is applied to a case that an optical disk has plural recording layers. FIG. 4A is an illustration showing an optical path of a laser beam focused on a flat recording layer 23 when an optical disk is tilted. In FIG. 4A, an optical axis 21 of the laser beam is tilted with respect to a normal line 22 to the recording layer 23 by a certain angle 26. The angle 26 corresponds to a tilt angle. As shown in FIG. 4A, the laser beam that is incident through a base member 29 by way of a surface 27 of the optical disk is reflected from the recording layer 23. Specifically, the optical path 25 passes the points A, B', C', D' and, E'. The length of the optical path 25 is the same between the case that the optical disk is not tilted and the case that the optical disk is tilted. Accordingly, tilt of the optical disk cannot be detected with use of the reflected laser beam from the recording layer 23. Therefore, in this embodiment, as shown in FIG. 4B, a dispersing part 24 where the incident beam is dispersed is formed in a part of the recording layer 23, so that tilt detection is performed based on the dispersed beams on the dispersing part 24. In FIG. 4B, the laser beam passing the point A is focused on the point C' via the point B', and the laser beam focused on the point C' is dispersed as the dispersed beams on the dispersing part 24. The dispersed beams on the dispersing part 24 absorb a light energy of the incident laser beam of a wavelength λ0, and are substantially symmetrically irradiated with a large angle with respect to the normal line 22 to the recording layer 23 with each one of the dispersed beams having the same wavelength λ0 as the incident laser beam. Since the dispersed beams have no or less correlation to the phase of an incoming beam, namely, the incident laser beam that has passed through the points A, B', and C', the dispersed beams have tilt aberration and coma aberration. Accordingly, tilt of the optical disk can be detected based on the tilt aberration and the coma aberration of the dispersed beams. FIG. 4C shows a case that a dispersing layer 28 which has a certain positional relation to the recording layer 23 and which is adapted to disperse the incident beam is formed. In FIG. 4C, the dispersing layer 28 is formed parallel to the recording layer 23. In FIG. 4C, tilt of the recording layer 23 is indirectly detected by performing tilt detection using the dispersed beams on the dispersing layer 28. In FIG. 4C, a laser beam passing the point A is focused on the point C' via the point B'. Since the point C' lies on the dispersing layer 28, the dispersed beams absorb a light energy of the incident laser beam of the wavelength λ0, and are substantially symmetrically irradiated with a large angle with respect to the normal line 22 to the recording layer 23 with each one of the dispersed beams having the same wavelength λ0 as the incident laser beam. Similarly to the case shown in FIG. 4B, in FIG. 4C, since the dispersed beams have no or less correlation to the phase of an incoming beam, namely, the incident laser beam that has passed through the points A, B', and C', tilt of the dispersing layer 28 can be detected by tilt aberration and coma aberration of the dispersed beams, and tilt of the recording layer 23 can be indirectly detected based on the tilt of the dispersing layer 28. An example as to how the dispersing layer 28 is formed is described in detail in a third embodiment.

Figure 5:
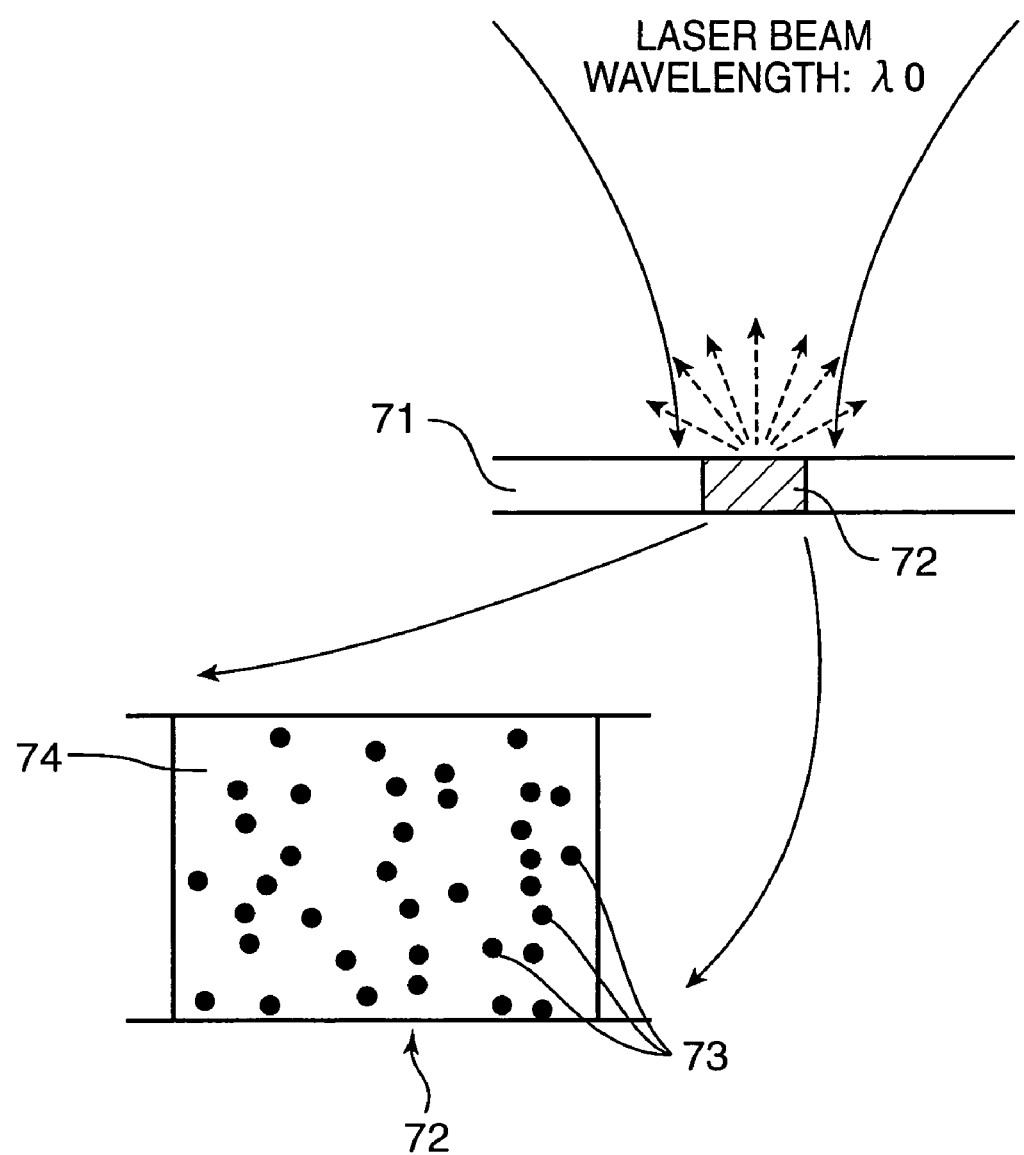
FIG. 5 is an illustration for explaining an arrangement of a recording layer of an optical disk in the second embodiment.

FIG. 5 is an illustration for explaining an arrangement of a recording layer of an optical disk in the second embodiment. A dispersing part 72 is formed in a part of a recording layer 71 of the optical disk. The dispersing part 72 is formed by partly randomizing the phase of an incident laser beam.

The following is an example as to how the dispersing part 72 is formed.

Figure 6A:
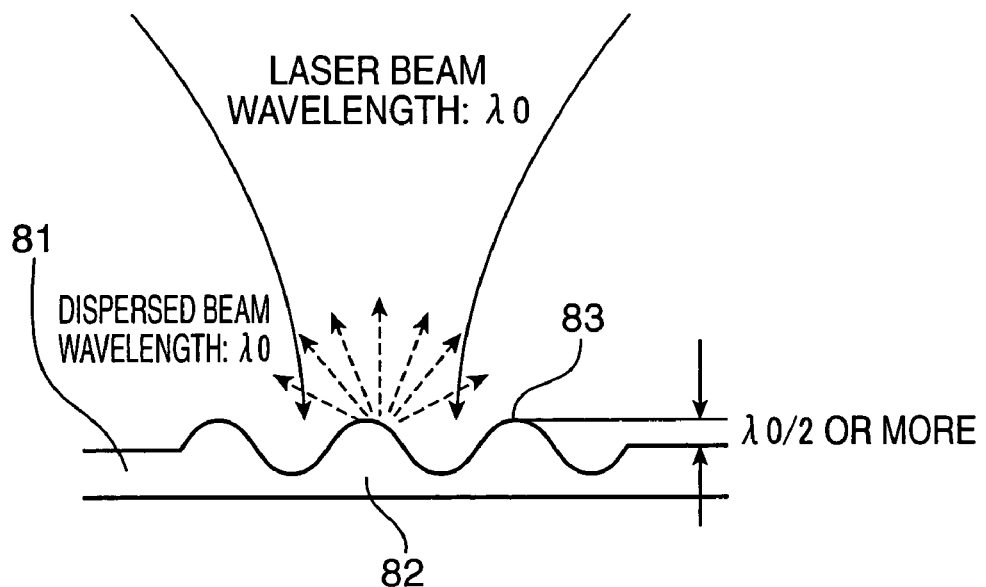
FIGS. 6A and 6B are illustrations for explaining an arrangement of the recording layer of the optical disk in the second embodiment.

1) A diffuse reflection part for diffusingly reflecting light is formed by forming asperities on a surface of a recording layer of an optical disk. FIG. 6A is an illustration showing an example of the diffuse reflection part. Preferably, the depth of a recess or the height of a protrusion on the diffuse reflection part, namely, a dispersing part 82 is a half wavelength (λ0/2) or more, wherein λ0 is the wavelength of a laser beam. The recesses or the protrusions are formed by locally making a surface of a stamper corresponding to the dispersing part 82 coarse and by transferring the coarse surface of the stamper onto the surface of the recording layer 81 corresponding to the dispersing part 82. The laser beam of the wavelength λ0 is turned into dispersed beams each having the wavelength λ0 after diffusingly reflected from a dispersing surface 83 of the dispersing part 82. The dispersing surface 83 is obtained by forming the recording layer 81 into asperities. The dispersing part 82 may be constituted solely of recesses each having a depth corresponding to a half wavelength or more of the laser beam wavelength with respect to the surface of the recording layer 81, or may be constituted solely of protrusions each having a height corresponding to a half wavelength or more of the laser beam wavelength with respect to the surface of the recording layer 81.

2) Dispersants are dispersed in a medium having transmittance to a laser beam by a depth corresponding to at least a half wavelength or more of the laser beam wavelength. FIG. 5 shows an example of this technique. The medium 74 is translucent or semi-translucent to the wavelength of an incident laser beam. The dispersants 73 each have a refractive index different from that of the medium 74, and have a property that part of the incident laser beam is reflected from a boundary between each of the dispersants 73 and the medium 74. The dispersants 73 are substantially continuously dispersed in the medium 74 by a depth corresponding to at least the half wavelength or more.

In this arrangement, the incident laser beam is reflected from each of the dispersants 73 which are dispersed in the medium 74 at different depth positions, thereby randomizing the phase of the incident laser beam. It is possible to use dispersants with each one having a smaller size in molecule. However, it is preferable to use dispersants each having a certain molecule diameter to enhance reflecting efficiency. A particularly preferred example of the dispersants 73 satisfies a requirement: $\lambda/10 < D < \lambda/2$ where $\lambda$ represents the wavelength of an incident laser beam, and D represents an average diameter of the dispersants.

The dispersing part 72 shown in FIG. 5 may have asperities in a similar manner as the dispersing part 82 shown in FIG. 6A. Specifically, the dispersing part 72 is formed by dispersing dispersants in a medium having transmittance to a laser beam by a depth corresponding to at least a half wavelength or more of a laser beam wavelength, and by forming the surface of the medium into asperities.

Figure 6B:
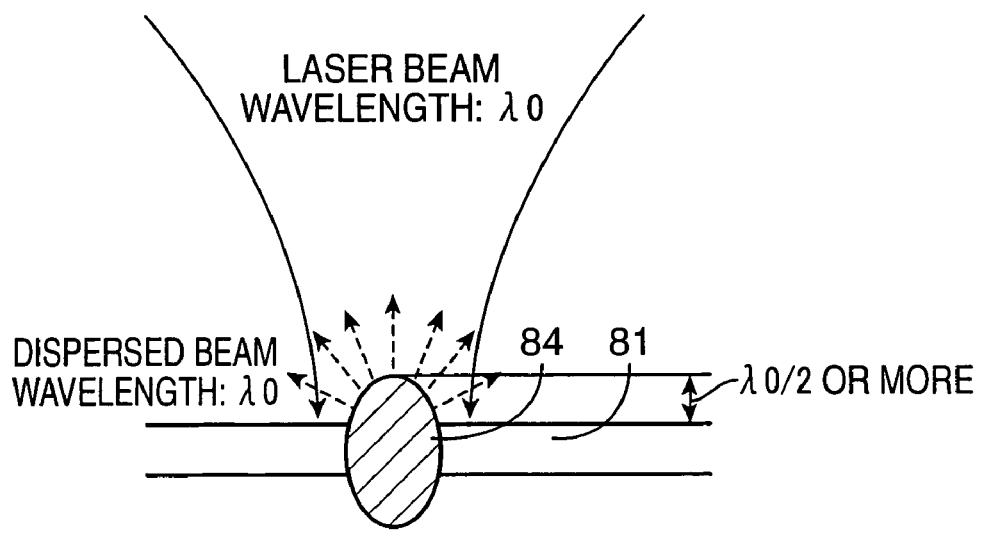

An example of the dispersants 73 includes organic materials such as various pigments. Alternatively, it is possible to use a material having a high dispersability such as Intralipid® to enhance dispersability. Alternatively, it is possible to disperse an inorganic material such as various pigments or fullerene. As a further altered arrangement, it is possible to irradiate a laser beam of a high output power into the medium 74 by using a laser pointer such as a YAG laser to modify a moiety of the medium 74, and to use the modified moiety of the medium 74 having a different refractive index from that of the other moiety of the medium 74, as dispersants 73. FIG. 6B shows an example of this technique. In FIG. 6B, a laser beam of a high output power is intensively irradiated for a short time onto the recording layer 81 serving as a medium, and voids 84 serving as a dispersant is formed. In this case, one void 84 is formed by one time irradiation of a laser beam. Alternatively it is possible to disperse micronuclei into a medium in advance and to form the micronuclei into a multitude of voids by one time laser irradiation. For instance, it is possible to disperse micro absorbents having a high absorption factor of absorbing an energy of a high-output laser beam, as compared with a medium, into the medium as nuclei, and to irradiate a laser beam onto the absorbents. Then, solely the absorbents are heated to a high temperature, and dispersants are formed around the absorbents due to formation of the voids or the modified moiety of the medium. In other words, the dispersant can be formed by growing micronuclei. The number of the dispersants to be formed by one time laser irradiation can be arbitrarily set by properly regulating the amount of the absorbents which serve as the nuclei to be dispersed. Preferably, the wavelength of the high-output laser beam for forming a void or voids is different from the laser beam wavelength to be used for recording/reproducing, and the absorbents to be used to form the nuclei of the dispersants have a high transmittance to the laser beam wavelength used for recording/reproducing. This arrangement enables to simplify the process of producing an optical disk because there is no adverse influence to recording/reproducing even if the absorbents to be used to form the nuclei of the dispersant are dispersed in the entirety of the optical disk.

It is possible to remarkably reduce the laser energy required for growing the nuclei into dispersants by adding a reactive chemical to the absorbents to be used to form the nuclei. For instance, it is possible to make a microcapsule of the absorbents to be used to form the nuclei, to encapsulate a reactive chemical which invokes a chemical reaction with a medium into the microcapsule, to smash the microcapsule by high-output laser irradiation so as to modify the medium by chemical reaction of the reactive chemical encapsulated in the microcapsule with the medium, and to use the modified moiety of the medium as dispersants.

Alternatively, it is possible to disperse, in a medium, a photosensitive material which is photochemically reactive to light of a wavelength different from the laser beam wavelength to be used for recording/reproducing, and to selectively irradiate the light during a process of producing an optical disk for forming a dispersing part on an intended site of the optical disk. Examples of the photosensitive material include photosensitive pigments which are generally used in optical recording media such as an optical disk and a silver-halide photograph and which have appropriate wavelength characteristics.

Figure 7:
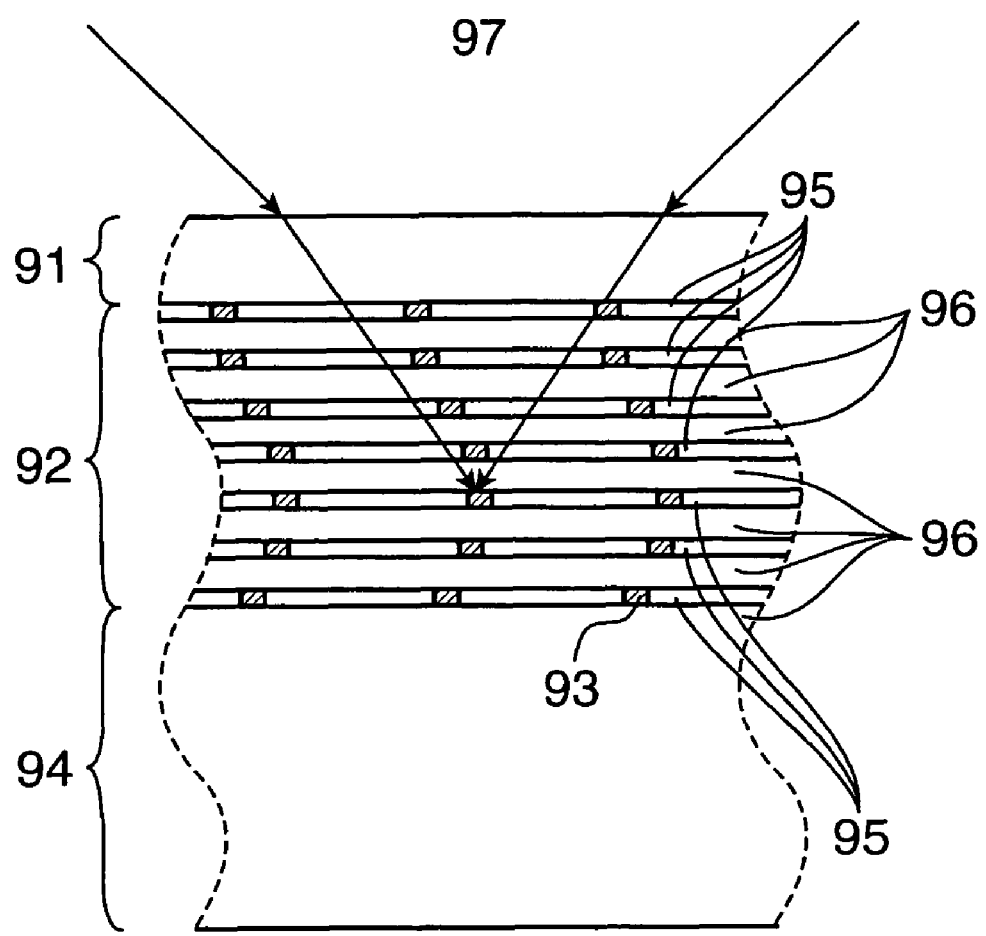
FIG. 7 is a cross-sectional view of the optical disk in the second embodiment.

FIG. 7 is an illustration showing a cross section of a multilayer optical disk in the second embodiment using the structures shown in FIGS. 5, 6A, and 6B. The optical disk in this embodiment includes an upper base member 91, a recording layer stack 92, and a lower base member 94. The recording layer stack 92 corresponds to a portion where a number of recording layers 95 are formed one over the other via an intermediate layer 96. A part of the respective recording layers 95 in the recording layer stack 92 is formed into a dispersing part 93 where dispersed beams are irradiated when a laser beam 97 is irradiated. A photochromic material such as diarylethene or fulgide is used as a recording material for forming the recording layers 95. Voids of about 0.1 μM in average diameter or a surface formed by transferring an asperity surface with use of a stamper are used as dispersants. A UV curing resin or ZnS—$SiO_2$ is used as the intermediate layers 96.

In FIG. 7, the thickness of the dispersing part 93 is set equal to that of the corresponding recording layer 95, and the dispersing part 93 is formed at plural predetermined sites in each of the recording layers 95. Alternatively, the dispersing parts 93 in the respective recording layers 95 may be collectively formed in the thickness direction of the recording layers 95. Particularly, irradiating a dispersing-part-forming laser beam over the entirety of the recording layer stack 92 to collectively form the dispersing parts 93 in the respective recording layers 95 after forming the recording layer stack 92 makes it possible to eliminate a step of forming the dispersing part 93 with respect to each of the recording layers 95, thereby remarkably reducing the number of steps in the process of producing an optical disk. The incident numerical aperture (NA) of the dispersing-part-forming laser beam is 0.3 or less, preferably 0.1 or less, which is approximate to that of a parallel beam, and the configurations of the dispersing parts from the uppermost recording layer to the lowermost recording layer are substantially identical to each other. Examples of the dispersing-part-forming laser beam include, in addition to the aforementioned high-output laser beam, short wavelength beams such as DUV, EUV, an X-ray, a synchrotron radiation ray, and an electron beam. Use of the short wavelength beams not only enables to effectively suppress unduly increase of an area of the dispersing part 93 due to diffraction even with use of a small NA, but also enables to easily induce a change of the refractive index due to modification of the recording layers 95 and the intermediate layers 96, because the respective short wavelength beams is a high energy beam. This arrangement enables to select a material for the recording layers 95 and the intermediate layers 96 from a wide range.

Figure 8:
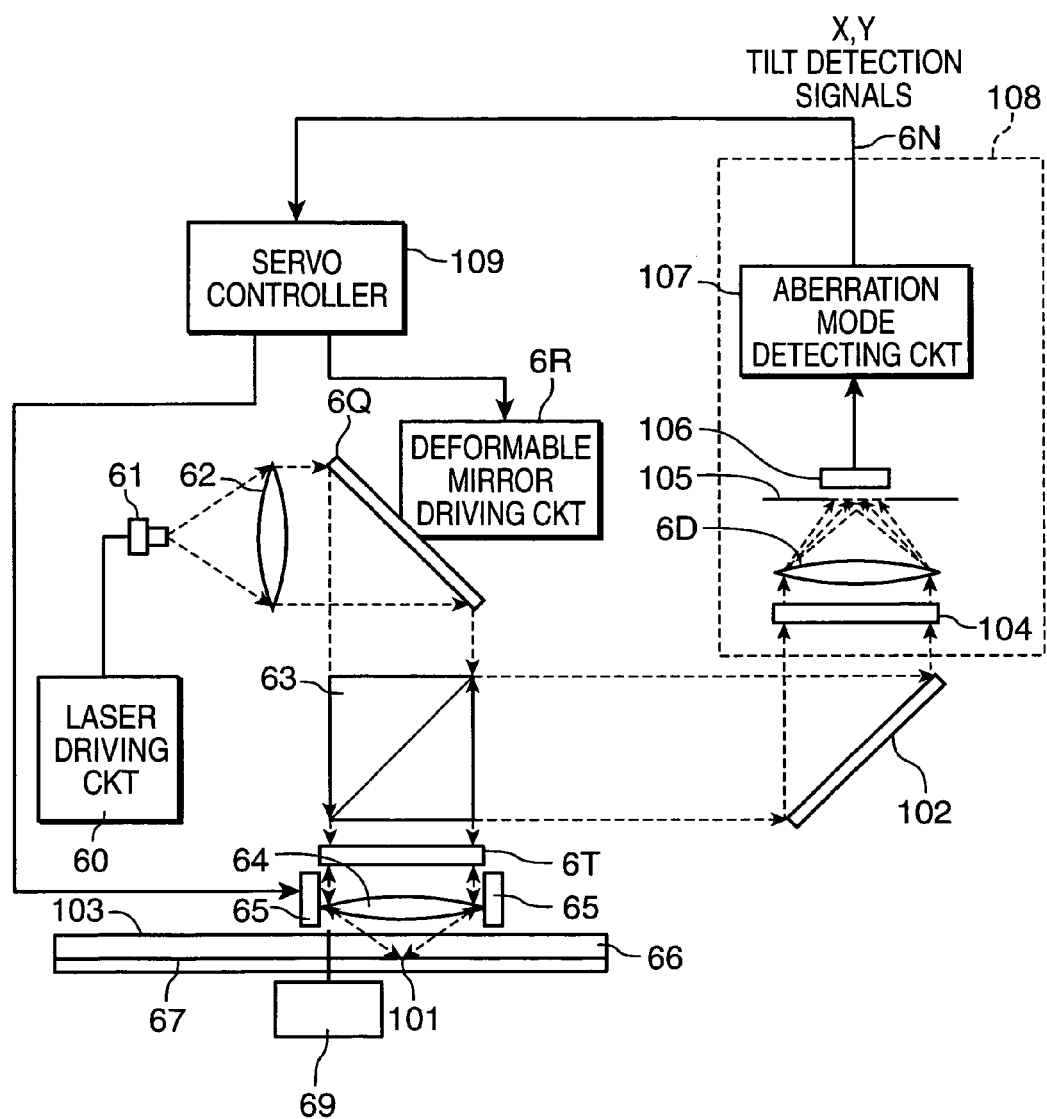
FIG. 8 is an illustration showing an arrangement of an optical disk apparatus in the second embodiment.

FIG. 8 is an illustration showing an arrangement of an optical disk apparatus in the second embodiment. The optical disk apparatus shown in FIG. 8 is an example in which the optical disk shown in FIG. 7 is applied. An optical disk 103 for use in the optical disk apparatus is constructed such that each of recording layers in a recording layer stack 67 has a dispersing part 101. The dispersing part 101 is formed at predetermined sites in the number of about 10 to 50 per circumference of the optical disk 103, so that the optical disk apparatus can discriminate a detection timing of the dispersing part 101 based on timing information sent from the target recording layer.

The arrangements of a laser driving circuit 60, a laser pointer 61, a collimator lens 62, a deformable mirror 6Q, a deformable mirror driving circuit 6R, a deflecting beam splitter 63, an objective lens 64, an objective lens actuator 65, the recording layer stack 67, a spindle motor 69, a condenser lens 6D, X-,Y-tilt detection signals 6N, a deformable mirror 6Q (sic), a deformable mirror driving circuit 6R (sic), and a quarter (¼) wavelength plate 6T are the same as the corresponding ones explained in the first embodiment, respectively. Although an even symmetrical aberration sensor 6S for correcting spherical aberration of the deformable mirror 6Q is not shown, the sensor 6S substantially equivalent to the sensor 6S in the first embodiment is provided.

The second embodiment is different from the first embodiment in the arrangement of a tilt sensor 108. The tilt sensor 108 in the second embodiment is different from the tilt sensor 6P in the first embodiment in that the condenser lens 6D in the tilt sensor 108 is fixed and that tilt detection is intermittently performed with respect to the dispersing parts 93. In the optical disk apparatus of this embodiment, since a laser beam is focused onto the target recording layer of the optical disk 103, the laser beam incident onto the tilt sensor 108 does not have a large defocus aberration or a large spherical aberration. Therefore, in this embodiment, focusing can be performed sufficiently merely with use of the condenser lens without cancellation of defocus aberration or spherical aberration.

In an initial state of the optical disk apparatus such as turning on of the power thereof, a servo controller 109 controls the objective lens actuator 65 to drive the objective lens 64 in such a manner that a laser beam is focused onto a target recording layer in the recording layer stack 67. Since the laser beam is focused onto the target recording layer of the optical disk 103, the control procedure can be executed independently of the tilt sensor 108. Specifically, the servo controller 109 controls the deformable mirror 6Q based on a spherical aberration detection value outputted from the even symmetrical aberration sensor which is not shown in FIG. 8 in such a manner that spherical aberration is correctively added for the recording layer on which the laser beam is focused. Further, the servo controller 109 controls the objective lens actuator 65 based on a defocus aberration detection value outputted from the even symmetrical aberration sensor which is not shown in FIG. 8 to focus the laser beam onto a target recording layer. Tilt of the optical disk is detected based on the X-, Y-tilt detection signals 6N obtained at this time.

The dispersing parts are formed at a predetermined interval along a track in the recording layer. For instance, in the case where tracking control is executed according to a sample servo system, constituting a servo mark of the dispersants as mentioned above is equivalent to an arrangement that the dispersing parts are formed at a predetermined interval.

The dispersing parts may be made of a material capable of emitting light of a wavelength different from the laser beam wavelength. For instance, a similar effect as mentioned above can be obtained by using a fluorescent material such as diarylethene or fulgide in place of the dispersants, and by performing tilt detection based on fluorescence emitted from a fluorescent portion made of the fluorescent material. In this case, since the laser beam incident onto the fluorescent portion, and the fluorescence are different in wavelength, it is possible to isolate the fluorescence by using an optical filter or the like for tilt detection. This arrangement also enables to improve detection sensitivity in tilt detection.

In the optical disk apparatus as mentioned in this embodiment, the phase of the laser beam irradiated onto the dispersants is randomized, and the laser beam is irradiated as dispersed beams. This arrangement enables to perform tilt detection of a high precision by detecting tilt aberration or coma aberration of the dispersed beams.

Third Embodiment

Next, a third embodiment of the invention is described referring to the drawings.

Figure 9:
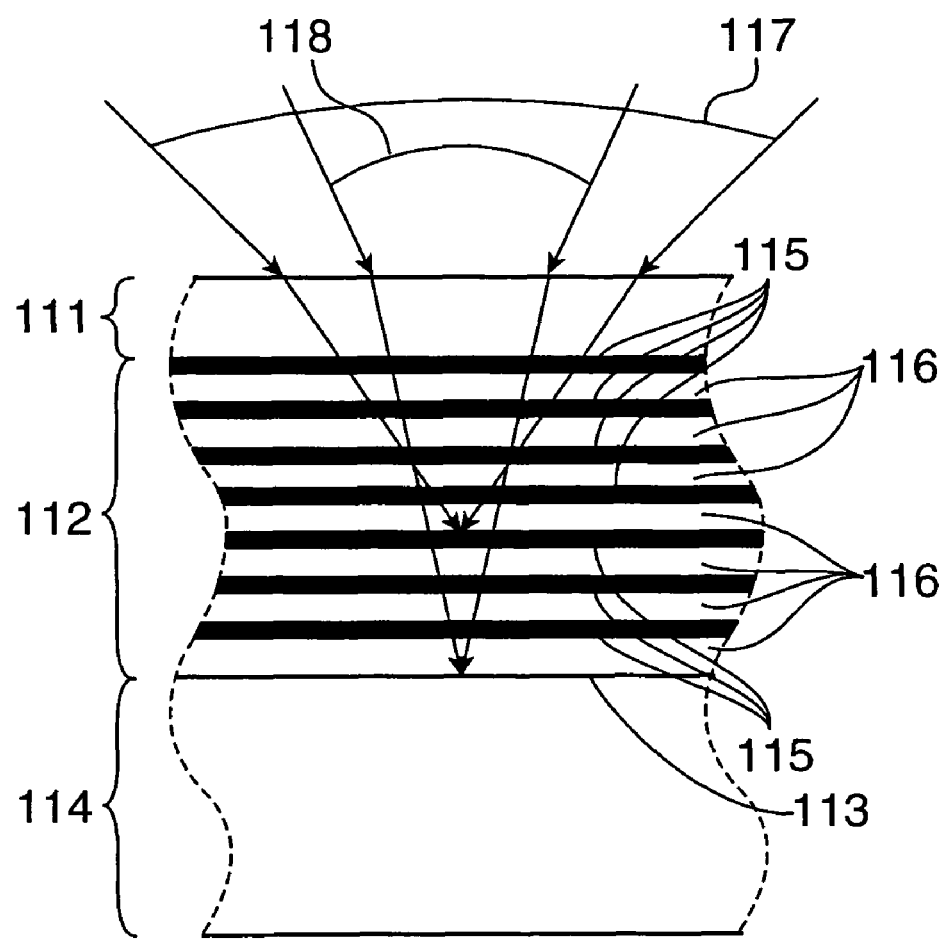
FIG. 9 is a cross-sectional view of an optical disk in a third embodiment of the invention.

FIG. 9 is an illustration showing a cross section of a multilayer optical disk in the third embodiment. The optical disk includes an upper base member 111, a recording layer stack 112, a dispersing layer 113, and a lower base member 114. The recording layer stack 112 corresponds to a portion where a number of recording layers 115 are formed one over the other via an intermediate layer 116. Also, the respective recording layers 115 in the recording layer stack 112 are formed parallel to the dispersing layer 113. These parallel layers are formed, for instance, by forming one intermediate layer 116 on the dispersing layer 113 by spin coat or sputtering, and by forming a recording layer 115 and then another intermediate layer 116 by spin coat or sputtering. Thus, the recording layers 115 and the dispersing layer 113 are formed parallel to each other. A photochromic material such as diarylethene or fulgide is used for forming the recording layers 112 (sic). A UV curing resin, ZnS—$SiO_2$ or a like material is used for forming the intermediate layers 116, for instance. The dispersing layer 113 is formed by dispersing particles of the same material as the dispersants in the second embodiment with each one of the particles having a maximal diameter corresponding to at least a half wavelength or less of an incident laser beam wavelength with a predetermined density at random, for instance. A laser beam 117 is focused on the target recording layer 115, and a laser beam 118 is focused on the dispersing layer 113. The laser beam 117 is used for recording on or reproducing from the recording layers, and the laser beam 118 is used for tilt detection. When the laser beam 118 is irradiated onto the dispersing layer 113, dispersed beams are irradiated from the dispersing layer 113. Aberration by tilt is detected by using the dispersed beams.

Figure 10:
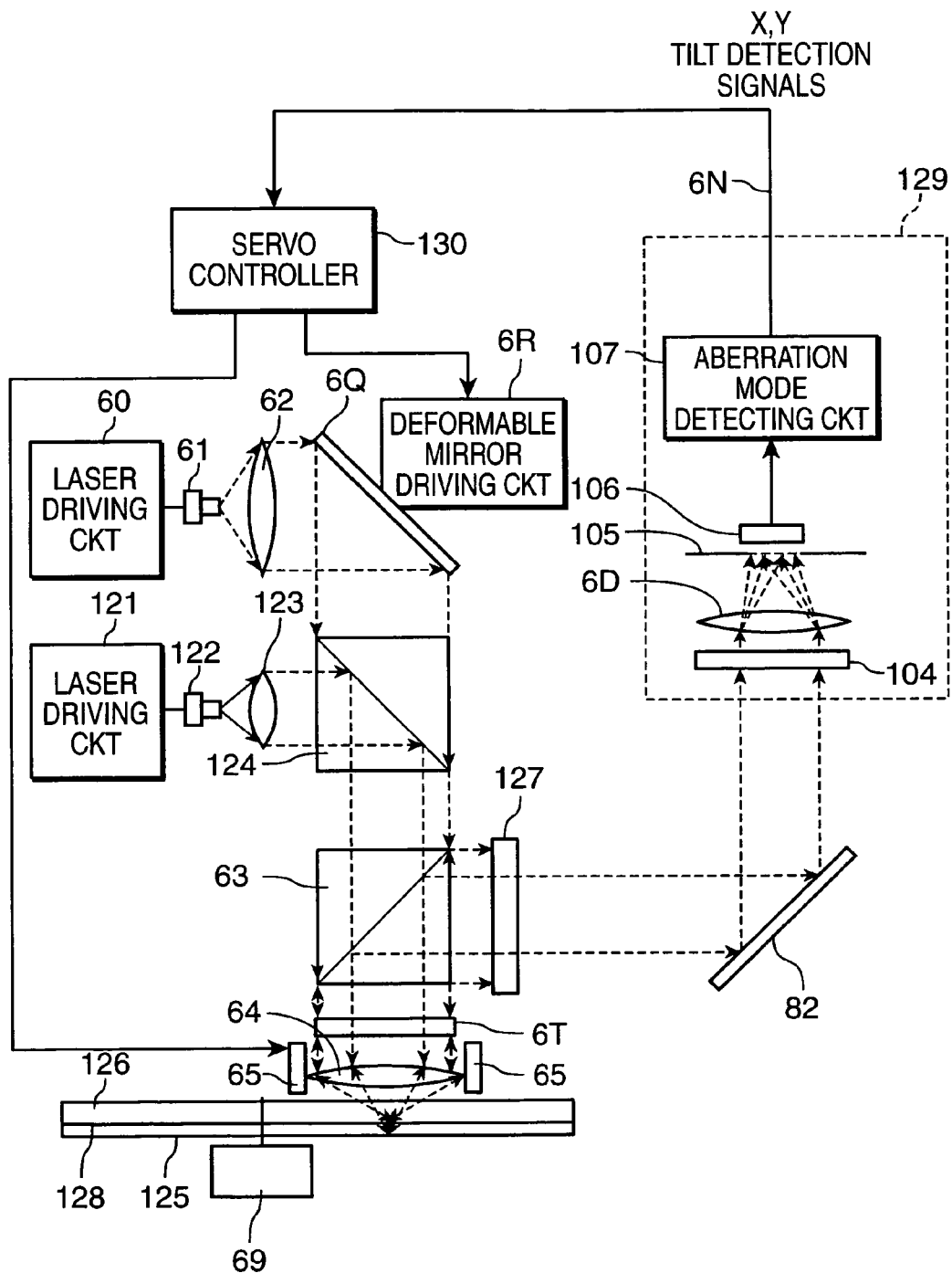
FIG. 10 is an illustration showing an arrangement of an optical disk apparatus in the third embodiment.

FIG. 10 is an illustration showing an arrangement of an optical disk apparatus in the third embodiment. The optical disk apparatus shown in FIG. 10 is an example in which the optical disk shown in FIG. 9 is applied. An optical disk 126 is the multilayer optical disk shown in FIG. 9. The optical disk 126 has a dispersing layer 125 in addition to a recording layer stack 128. The dispersing layer 125 is formed parallel to the recording layers in the recording layer stack 128. Although an even symmetrical aberration sensor 6S for correcting spherical aberration of a deformable mirror 6Q is not shown, the sensor 6S equivalent to the sensor 6S in the first embodiment is provided.

A laser driving circuit (first laser driving circuit) 60 oscillates a laser beam of a wavelength $\lambda 0$ by driving a laser pointer (first laser pointer) 61. A laser beam emitted from the laser pointer 61 is converted into parallel rays by a collimator lens (first collimator lens) 62, and the parallel rays are incident onto the deformable mirror 6Q. In the deformable mirror 6Q, spherical aberration correction is performed by using the laser beam of the wavelength $\lambda 0$ based on a detection value from a spherical aberration sensor, which is not shown in FIG. 10. Specifically, a servo controller 130 controls the deformable mirror 6Q based on the spherical aberration detection value outputted from the even symmetrical aberration sensor, which is not shown in FIG. 10, in such a manner that spherical aberration is correctively added for the target recording layer on which the laser beam of the wavelength $\lambda 0$ is focused. The laser beam reflected from the deformable mirror 6Q is incident onto a deflecting beam splitter 124.

A second laser driving circuit 121 oscillates a laser beam of a wavelength $\lambda 1$ by driving a second laser pointer 122. The wavelength $\lambda 0$ is different from the wavelength $\lambda 1$. For instance, the wavelength $\lambda 0$ is 405 nm, and the wavelength $\lambda 1$ is 650 nm or 780 nm. The laser beam emitted from the second laser pointer 122 is converted into substantially parallel rays by a second collimator lens 123, and the parallel rays are incident onto the deflecting beam splitter 124.

The laser beam of the wavelength $\lambda 0$ and the laser beam of the wavelength $\lambda 1$ are emitted from a surface other than the incident surface of the deflecting beam splitter 124. The optical axis of the laser beam of the wavelength $\lambda 0$ and the optical axis of the laser beam of the wavelength $\lambda 1$ are aligned to each other. Also, the numerical aperture of the laser beam of the wavelength $\lambda 1$ is smaller than the numerical aperture of the laser beam of the wavelength $\lambda 0$.

The laser beam of the wavelength $\lambda 0$ and the laser beam of the wavelength $\lambda 1$ which are emitted from the deflecting beam splitter 124 are incident onto a deflecting beam splitter 63. The laser beam of the wavelength $\lambda 0$ and the laser beam of the wavelength $\lambda 1$ which have been incident onto the deflecting beam splitter 63 propagate through the deflecting beam splitter 63, and a quarter wavelength plate 6T, and are incident onto an objective lens 64. The objective lens 64 focuses the laser beam of the wavelength $\lambda 0$ onto a target recording layer in the recording layer stack 128 of the optical disk 126. Simultaneously, the objective lens 64 focuses the laser beam of the wavelength $\lambda 1$ onto the dispersing layer 125 by position control of the second collimator lens 123 through driving of an actuator of the second collimator lens 123, which is not shown in FIG. 10. When the dispersing layer 125 absorbs an energy of the laser beam of the wavelength $\lambda 1$, which is irradiated by the second laser pointer 122, dispersed beams each having the wavelength $\lambda 1$ go out from the dispersing layer 125. Part of the dispersed beams going out from the dispersing layer 125 is incident onto the objective lens 64, propagates through the quarter wavelength plate 6T, and is incident onto the deflecting beam splitter 63. Also, the laser beam of the wavelength $\lambda 0$ which has been focused on a target recording layer in the recording layer stack 128 is reflected from the target recording layer in the recording layer stack 128, is incident onto the objective lens 64, propagates through the quarter wavelength plate 6T, and is incident onto the deflecting beam splitter 63.

After the laser beam is incident onto the deflecting beam splitter 63, the laser beam reflected from the recording layer in the recording layer stack 128, and the dispersed beams dispersed from the dispersing layer 125 are reflected from the deflecting beam splitter 63 in a direction different from the direction of the incoming beam, and are incident onto an optical filter 127. The optical filter 127 has spectral characteristics of passing a beam of the wavelength λ0 and reflecting a beam of the wavelength λ1. In this arrangement, the reflected beam from the target recording layer in the optical disk 126 is not allowed to pass through the optical filter 127, and is incident onto an unillustrated reproduction signal sensor. The reproduction signal sensor detects the incident beam, and reads out information recorded on the target recording layer. Also, the optical filter 127 passes the dispersed beams of the wavelength λ1 from the dispersing layer 125. The dispersed beams of the wavelength λ1 which have passed through the optical filter 127 are reflected from a reflective mirror 102, and incident onto a tilt sensor 129 indicated by the dotted line block in FIG. 10. The tilt sensor 129 shown in FIG. 10 has the same arrangement as the tilt sensor 108 shown in FIG. 8 except for the laser beam wavelength and the numerical aperture. The dispersed beams which have been incident onto the tilt sensor 129 are incident onto a hologram 104. Two kinds of bias X coma aberrations which are different in sign and identical in size, and two kinds of bias Y coma aberrations which are different in sign and identical in size are added to the incident laser beam in the hologram 104. The laser beam added with the respective bias aberrations in the hologram 104 is incident onto a condenser lens 6D. The laser beam incident onto the condenser lens 6D is focused on a pinhole plate 105. Four pinholes are formed in the pinhole plate 105 in correspondence to the number of the added bias aberrations.

The laser beams that have passed through the pinholes in the pinhole plate 105 are incident onto photo-sensors of a photo-sensor array 106 arrayed in correspondence to the pinholes, respectively. The laser beams incident onto the respective photo-sensors are converted into electrical signals, which are outputted to an aberration mode detecting circuit 107. A signal from each of the photo-sensors is differentially amplified in the aberration mode detecting circuit 107 with respect to each of the aberration modes. The aberration mode detecting circuit 107 outputs X-,Y-tilt detection signals 6N (X-,Y-coma aberration detection signals).

Since an operation of the optical disk apparatus shown in FIG. 10 is the same as that in FIG. 8, description thereof is omitted herein.

A laser beam is split before incident onto the optical filter 127, and the spherical aberration sensor for detecting spherical aberration of the laser beam of the wavelength λ0, a defocus sensor for detecting defocus aberration of the laser beam of the wavelength λ0, and the reproduction signal sensor, all of which are not shown in FIG. 10, are operated based on the split laser beam.

Alternatively, it is possible to obtain a similar effect as mentioned above by using a diffuse reflection surface or a fluorescent layer in place of the dispersing layer 125.

Use of the optical disk apparatus as described in this embodiment is advantageous in detecting tilt of the dispersing layer in light of the fact that dispersed beams are obtained by randomization of the phase of the laser beam irradiated on the dispersing layer, wherein aberration remains merely in the dispersed beams, and that tilt aberration or coma aberration is detected by using the outgoing beam. This arrangement enables to indirectly perform tilt detection of the target recording layer.

Also, the dispersing layer 125 is formed at a site different from the recording layer stack 128. As compared with an arrangement that a dispersing part is formed in a recording layer, this arrangement facilitates production of an optical disk. Further, this arrangement enables to use the entire surface of the recording layer as a surface for recording information, and to detect aberration continuously.

Fourth Embodiment

Next, a fourth embodiment of the invention is described referring to the drawings.

In the optical disk apparatus shown in FIG. 3, the optical disk 66 is constructed in such a manner that tilt aberration or coma aberration of the reflected beam from the reflecting layer 68 is not cancelled by forming the reflecting layer 68 parallel to the recording layers in the recording layer stack 67. The optical disk apparatus and the optical disk in this embodiment are designed such that tilt aberration or coma aberration of a reflected beam from a recording layer is not cancelled by changing the wavefront of an incoming beam into a certain shape in place of forming a reflecting layer. As a method for changing the wavefront of the incoming beam, there is proposed an idea of leaving spherical aberration of a certain amount or defocus aberration of a certain amount on the wavefront. In this sense, the arrangement in the fourth embodiment is substantially the same as that in FIG. 3 except for the following two points. One is that the optical disk in the fourth embodiment does not have a reflecting layer for reflecting a defocused laser beam. The other is that the optical disk apparatus in the fourth embodiment does not have an even symmetrical aberration sensor 6S as shown in FIG. 3 in light of a fact that merely a laser beam reflected from the recording layer is detected. The arrangement of the fourth embodiment is substantially the same as the arrangement shown in FIG. 3, but the operation in the fourth embodiment is different from that in the arrangement shown in FIG. 3 in the following point. Specifically, whereas the deformable mirror 6Q in the optical disk apparatus shown in FIG. 3 is adapted to cancel spherical aberration, a deformable mirror in this embodiment is adapted to change the wavefront of an incoming beam into a certain shape.

Figure 11:
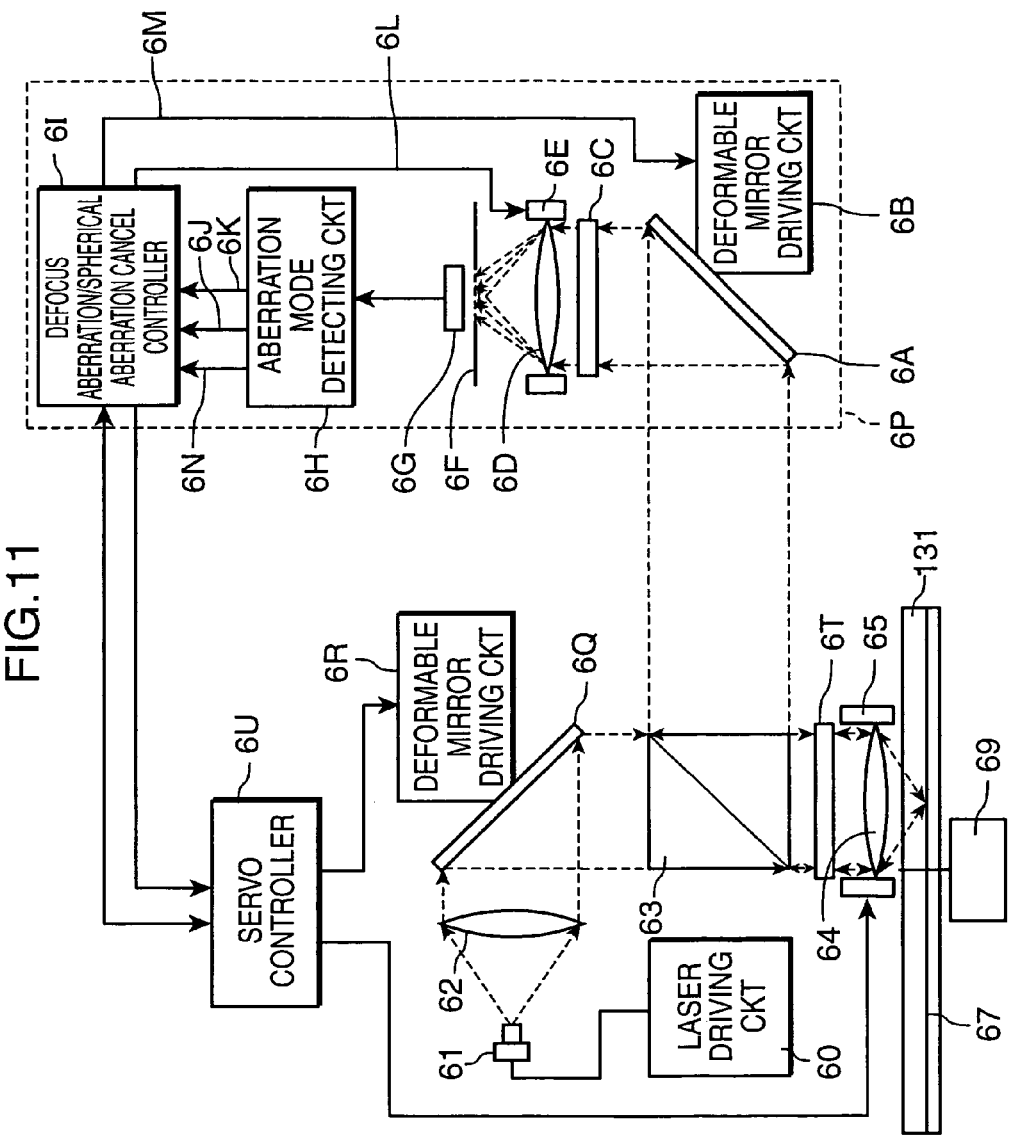
FIG. 11 is an illustration showing an arrangement of an optical disk apparatus in a fourth embodiment of the invention.

FIG. 11 is an illustration showing an arrangement of the optical disk apparatus in the fourth embodiment. FIG. 11 shows a case that a technique of leaving spherical aberration of a certain amount in an incoming beam is applied to the optical disk apparatus. An optical disk 131 corresponds to the multilayer optical disk shown in FIG. 2 except that a reflecting layer corresponding to the reflecting layer 53 is not formed.

Since a laser pointer 61, a laser driving circuit 60, and a collimator lens 62 shown in FIG. 11 have the same arrangement as the corresponding ones in FIG. 3, description thereof is omitted herein. After a laser beam is converted into parallel rays by the collimator lens 62, spherical aberration of the parallel rays are corrected by the deformable mirror 6Q. A servo controller 6U determines a spherical aberration correction value to be applied to the deformable mirror 6Q. Specifically, upon receiving a signal indicating a spherical aberration amount from a tilt sensor 6P, the servo controller 6U performs a predetermined computation based on the received spherical aberration amount to determine a spherical aberration correction value. The spherical aberration correction value is a computed value, which allows to leave spherical aberration of a predetermined amount. The servo controller 6U controls the deformable mirror 6Q by way of a deformable mirror driving circuit 6R to correctively tilt the deformable mirror 6Q in accordance with the spherical aberration correction value. Executing the feedback loop as mentioned above enables to controllably set a spherical aberration amount in the laser beams 57 which are focused on the target recording layer 59 in the recording layer stack 52 to a predetermined amount (see FIG. 2).

The laser beam going out from the deformable mirror 6Q propagates through a deflecting beam splitter 63 and a quarter (¼) wavelength plate 6T, and is incident onto an objective lens 64. The servo controller 6U controls an objective lens actuator 65 based on a defocus aberration amount outputted from the tilt sensor 6P. The objective lens actuator 65 drives the objective lens 64 in such a manner that the laser beam is focused on a target recording layer in a recording layer stack 67.

The laser beam that has reached the target recording layer in the recording layer stack 67 is reflected thereon, and is returned to the objective lens 64. At this time, tilt aberration and coma aberration in the incoming beam and the outgoing beam, namely, the laser beam that has been focused on the target recording layer in the recording layer stack and reflected thereon are not cancelled due to the existence of the aberration (in this case, spherical aberration) in the incoming beam.

The laser beam that has returned to the objective lens 64 propagates through the objective lens 64 and the quarter wavelength plate 6T, is reflected from the deflecting beam splitter 63 in a direction different from the direction of the incoming beam, and is incident onto the tilt sensor 6P.

The laser beam incident onto the tilt sensor 6P is incident onto a deformable mirror 6A. A deformable mirror driving circuit 6B changes the mirror configuration of the deformable mirror 6A in accordance with a spherical aberration control signal 6M outputted from a defocus aberration/spherical aberration cancel controller 6I. The deformable mirror 6A cancels spherical aberration of the laser beam incident onto the tilt sensor 6P. The spherical aberration corresponds to spherical aberration residue of a certain amount that has been left in the deformable mirror 6Q. The deformable mirror 6A may be omitted if a beam spot of a sufficient intensity is obtainable on a pinhole plate 6F, which will be described later, without cancellation of spherical aberration at this stage.

The laser beam reflected from the deformable mirror 6A is incident onto a hologram 6C. Eight kinds of bias aberrations, namely, two kinds of bias X coma aberrations which are different in sign and identical in size, two kinds of bias Y coma aberrations which are different in sign and identical in size, two kinds of bias defocus aberrations which are different in sign and identical in size, and two kinds of bias spherical aberrations which are different in sign and identical in size are added to the incident laser beam in the hologram 6C. The aberration amounts of the respective bias aberrations are determined by the detected aberration amounts, and preferably set to about half of the respective detected aberration amounts.

The laser beam added with the respective bias aberrations in the hologram 6C is incident onto a condenser lens 6D. The condenser lens 6D is supported by a condenser lens actuator 6E. The condenser lens actuator 6E moves the focus position of the condenser lens 6D depending on a defocus aberration control signal 6L outputted from the defocus aberration/spherical aberration cancel controller 6I. As mentioned above, defocus aberration is canceled by moving the condenser lens 6D. The condenser lens actuator 6E may be omitted, and the condenser lens 6D may be fixed at a predetermined position if a beam spot of a sufficient intensity is obtainable on the pinhole plate 6F, which will be described later, without cancellation of defocus aberration at this stage.

The laser beam incident onto the condenser lens 6D is focused on the pinhole plate 6F. Eight pinholes are formed in the pinhole plate 6F in correspondence to the number of the added bias aberrations. The radius of each of the pinholes is for instance 1/1.22 times as large as the radius of an airy disk.

The laser beams that have passed through the pinholes in the pinhole plate 6F are incident onto photo-sensors of a photo-sensor array 6G arrayed in correspondence to the pinholes, respectively. The laser beams incident onto the respective photo-sensors are converted into electrical signals, which are outputted to an aberration mode detecting circuit 6H. A signal from each of the photo-sensors is differentially amplified in the aberration mode detecting circuit 6H with respect to each of the aberration modes. Specifically, the aberration mode detecting circuit 6H outputs X-,Y-tilt detection signals 6N (X-,Y-coma aberration detection signals), a defocus aberration detection signal 6J, and a spherical aberration detection signal 6K. The X-,Y-tilt detection signals 6N (X-,Y-coma aberration detection signals) constitute an output from the tilt sensor 6P.

The defocus aberration detection signal 6J, the spherical aberration detection signal 6K, and the X-,Y-tilt detection signals 6N are outputted to the defocus aberration/spherical aberration cancel controller 6I. The defocus aberration/spherical aberration cancel controller 6I generates the defocus aberration control signal 6L for canceling the defocus aberration of the laser beam incident onto the condenser lens 6D based on the defocus aberration signal 6J outputted from the aberration mode detecting circuit 6H, and outputs the defocus aberration control signal 6L to the condenser lens actuator 6E. Likewise, the defocus aberration/spherical aberration cancel controller 6I generates the spherical aberration control signal 6M for canceling the spherical aberration of the laser beam incident onto the deformable mirror 6A based on the spherical aberration detection signal 6K outputted from the aberration mode detecting circuit 6H, and outputs the spherical aberration control signal 6M to the deformable mirror driving circuit 6B. Further, simultaneously, the defocus aberration/spherical aberration cancel controller 6I outputs four signals i.e. the defocus aberration detection signal, the spherical aberration detection signal, and the X-,Y-tilt detection signals to the servo controller 6U. The servo controller 6U and the defocus aberration/spherical aberration cancel controller 6I are communicated to each other by an interactive communication line.

Now, an operation of the optical disk apparatus in this embodiment is described. In an initial state of the optical disk apparatus such as turning on of the power of the apparatus, the servo controller 6U controls the objective lens actuator 65 to move the objective lens 64 in such a manner that a laser beam is focused on a target recording layer in the recording layer stack 67. An example of a control procedure from the initial state of the optical disk apparatus until a tilt detection signal is outputted is described as follows.

(1) The objective lens actuator 65 temporarily moves the objective lens 64 to such a position that a laser beam is substantially focused on the surface of the optical disk 66, specifically, on an uppermost recording layer of the recording layers in the recording layer stack 67.

(2) The servo controller 6U drives the objective lens actuator 65 to adjust the position of the objective lens 64 in such a manner that an "S-shaped curve" is detected based on the defocus aberration detection signal 6J with use of the laser beam reflected from the surface of the optical disk 66, specifically, on the uppermost recording layer of the recording layers in the recording layer stack 67. Further, the defocus aberration/spherical aberration cancel controller 61 controls the condenser lens actuator 6E of the tilt sensor 6P to adjust the position of the condenser lens 6D. Furthermore, simultaneously, spherical aberration is corrected with respect to the surface of the optical disk 66 in such a manner that correction amounts of spherical aberration are identical to each other between the deformable mirror 6A and the deformable mirror 6Q.

(3) When the "S-shaped curve" is detected based on the defocus aberration detection signal 6J using the laser beam reflected from the surface of the optical disk 66, specifically, on the uppermost recording layer of the recording layers in the recording layer stack 67, the servo controller 6U moves the objective lens 64 in such a manner that the focusing spot of the laser beam is moved in a downward direction from the surface of the optical disk 66. The servo controller 6U controls the deformable mirror 6A, the deformable mirror 6Q, and the condenser lens 6D of the tilt sensor 6P in such a manner that the "S-shaped curve" can be successively detected with respect to a next target recording layer in a similar manner as in (2). In this way, the servo controller 6U detects the "S-shaped curve" with respect to a target recording layer in the recording layer stack 67 one after another while counting the number of detection of the "S-shaped curve" with respect to these recording layers.

(4) When the "S-shaped curve" with respect to the target recording layer in the recording layer stack 67 is detected, the servo controller 6U controls the objective lens 64, the deformable mirror 6Q, the condenser lens 6D, and the deformable mirror 6A based on the defocus aberration detection signal 6J and on the spherical aberration detection signal 6K in the tilt sensor 6P in a similar manner as in (2).

(5) The servo controller 6U controls the deformable mirror 6A and the deformable mirror 6Q in such a manner that a difference in spherical aberration correction amount between the deformable mirror 6A and the deformable mirror 6Q is set to a predetermined value. At this time, tilt of the target recording layer in the recording layer stack 67 is detected based on the X-,Y-tilt detection signals outputted from the aberration mode detecting circuit 6H.

After the operation (5), the servo controller 6U detects the "S-shaped curve" using the defocus aberration detection signal 6J in the tilt sensor 6P to control the objective lens 64 in such a manner that the laser beam is focused on the target recording layer in the recording layer stack 67. Simultaneously, the servo controller 6U detects the "S-shaped curve" using the spherical aberration detection signal 6K in the tilt sensor 6P to control the deformable mirror 6A and the deformable mirror 6Q in such a manner that a difference in spherical aberration correction amount between the deformable mirror 6A and the deformable mirror 6Q is set to a predetermined value.

Further, as mentioned above, changing the wavefront of the incoming beam means that the focusing spot on the target recording layer of the optical disk 131, namely, the beam spot is not reduced to the limit of diffraction. This means that the beam spot may be increased with the result that the recording density may be lowered. In view of this, the wavefront of the incoming beam is changed in a time-sharing manner at a predetermined timing to avoid an influence to the recording capacity of user data, for instance, on a data format, namely, on an area where significant data is not recorded such as a run-in area and a run-out area.

It should be noted that the time-sharing process is not required if the tilt detection in this embodiment is performed using a laser beam of a wavelength other than the laser beam wavelength used in recording and reproducing.

Also, there is a technique of reducing the aperture in addition to the technique of adding defocus aberration of a certain amount and spherical aberration of a certain amount to change the wavefront of the incoming beam. In such an altered arrangement, the beam spot on the recording layer is increased by reducing the aperture. Thereby, an effect resulting from use of the asperities on the recording layer as a dispersing surface, and an effect resulting from use of a recording mark on the recording layer as dispersants to generate dispersed beams are added to the effect resulting from the change of the wavefront.

In the optical disk apparatus having the above arrangement in this embodiment, defocus aberration of a certain amount and spherical aberration of a certain amount are added to the wavefront of the laser beam to be irradiated onto the recording layer. This arrangement enables to detect tilt aberration or coma aberration, which represents tilt of the recording layer, by using the reflected beam from the recording layer, even if the recording layer is flat, thereby enabling to perform tilt detection of a high precision.

Fifth Embodiment

Next, a fifth embodiment of the invention is described referring to the drawings.

The optical disk apparatuses in the first through the fourth embodiments are designed to detect tilt of an optical disk by detecting a reflected beam from the optical disk. The optical disk apparatus in the fifth embodiment is designed to detect tilt of an optical disk by detecting tilt aberration or coma aberration of a laser beam which is passed through recording layers of an optical disk, and goes out from a surface of the optical disk opposite to a laser beam incident surface where the laser beam is incident.

Figure 12:
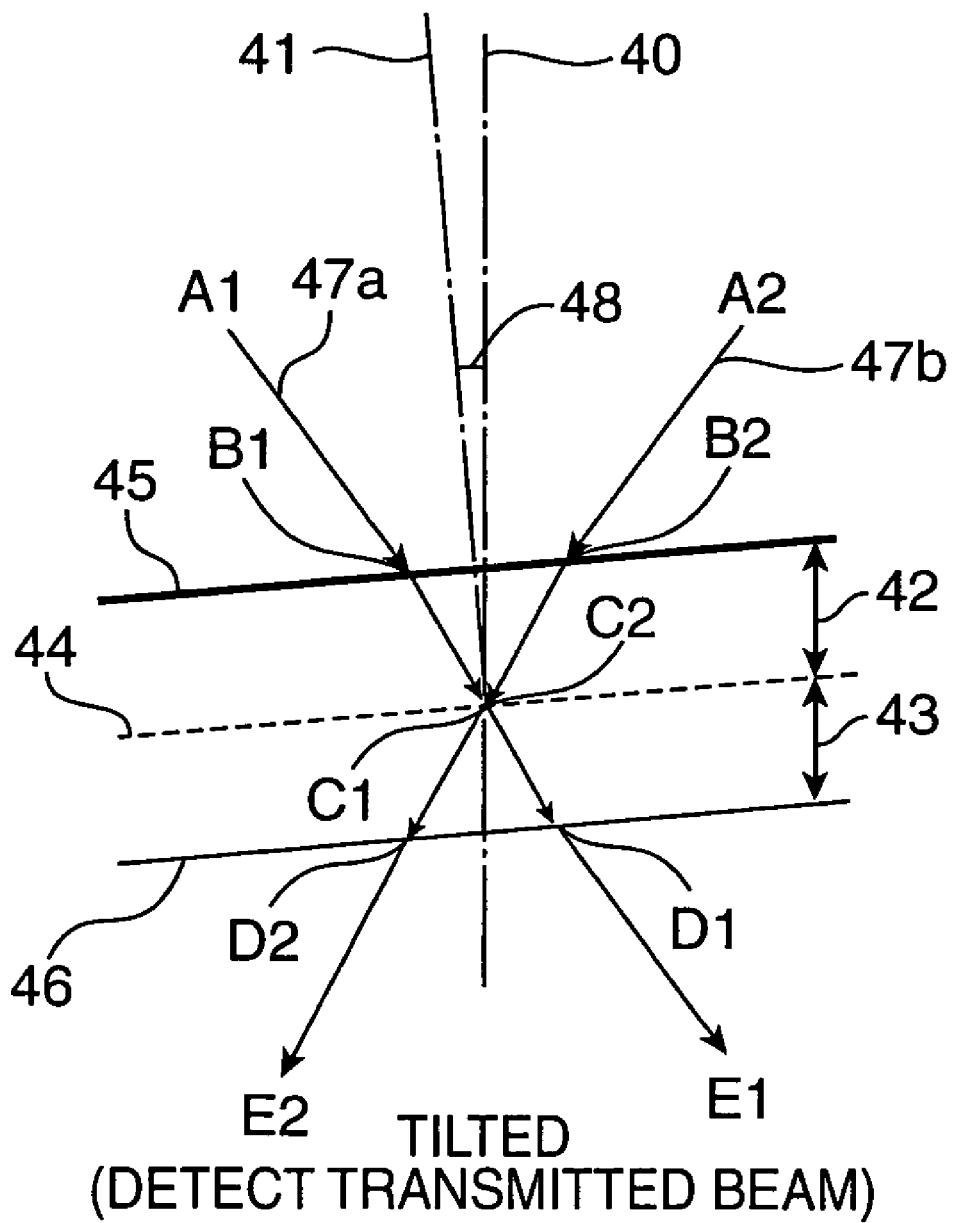
FIG. 12 is an illustration for explaining a principle of tilt detection in a fifth embodiment of the invention.

FIG. 12 is an illustration for explaining a principle of tilt detection in the fifth embodiment. Although FIG. 12 shows an example that an optical disk has a single recording layer for sake of easy explanation, the same principle is applied to a case that an optical disk has plural recording layers. FIG. 12 is an illustration showing an optical path of a laser beam which is focused on a flat recording layer 44 when an optical disk is tilted. In FIG. 12, an optical axis 40 of the laser beam is tilted with respect to a normal line 41 to the recording layer 44 by a certain angle 48. The angle 48 corresponds to a tilt angle. The laser beam that is incident on a top surface 45 of the optical disk propagates through an upper base member 42, the recording layer 44, a lower base member 43, and goes out through a back surface 46 of the optical disk. Specifically, an optical path 47a passes the point A1, the point B1 on the top surface 45 of the optical disk, the point C1 on the recording layer 44, and the points D1, E1 on the back surface 46 of the optical disk. An optical path 47b which is symmetrical to the optical path 47a with respect to the optical axis 40 passes the point A2, the point B2 on the top surface 45 of the optical disk, the point C on the recording layer 44, and the points D2, E2 on the back surface 46 of the optical disk. Since the optical disk is tilted, the optical path length from the point B1 to the point C1 is longer than the optical path length from the point B2 to the point C2 by the tilted amount. Since the optical disk is tilted, the optical path length from the point C1 to the point D1 is shorter than the optical path length from the point C2 to the point D2 by the tilted amount. In this arrangement, the optical path 47a is shorter than the optical path 47b.

Optical paths symmetrical with respect to the optical axis 40 have the same correlation as mentioned above. Accordingly, asymmetrical aberration with respect to the optical axis is included in a laser beam passing through the tilted optical disk, and this asymmetrical aberration corresponds to tilt aberration or coma aberration. Unlike an arrangement that tilt is detected by using a reflected beam from a recording layer, tilt aberration or coma aberration in this case is not cancelled by the transmitted beam. As shown in FIG. 12, when the optical disk is tilted, tilt aberration or coma aberration is not cancelled and is included in a laser beam passing through the optical disk.

Figure 13:
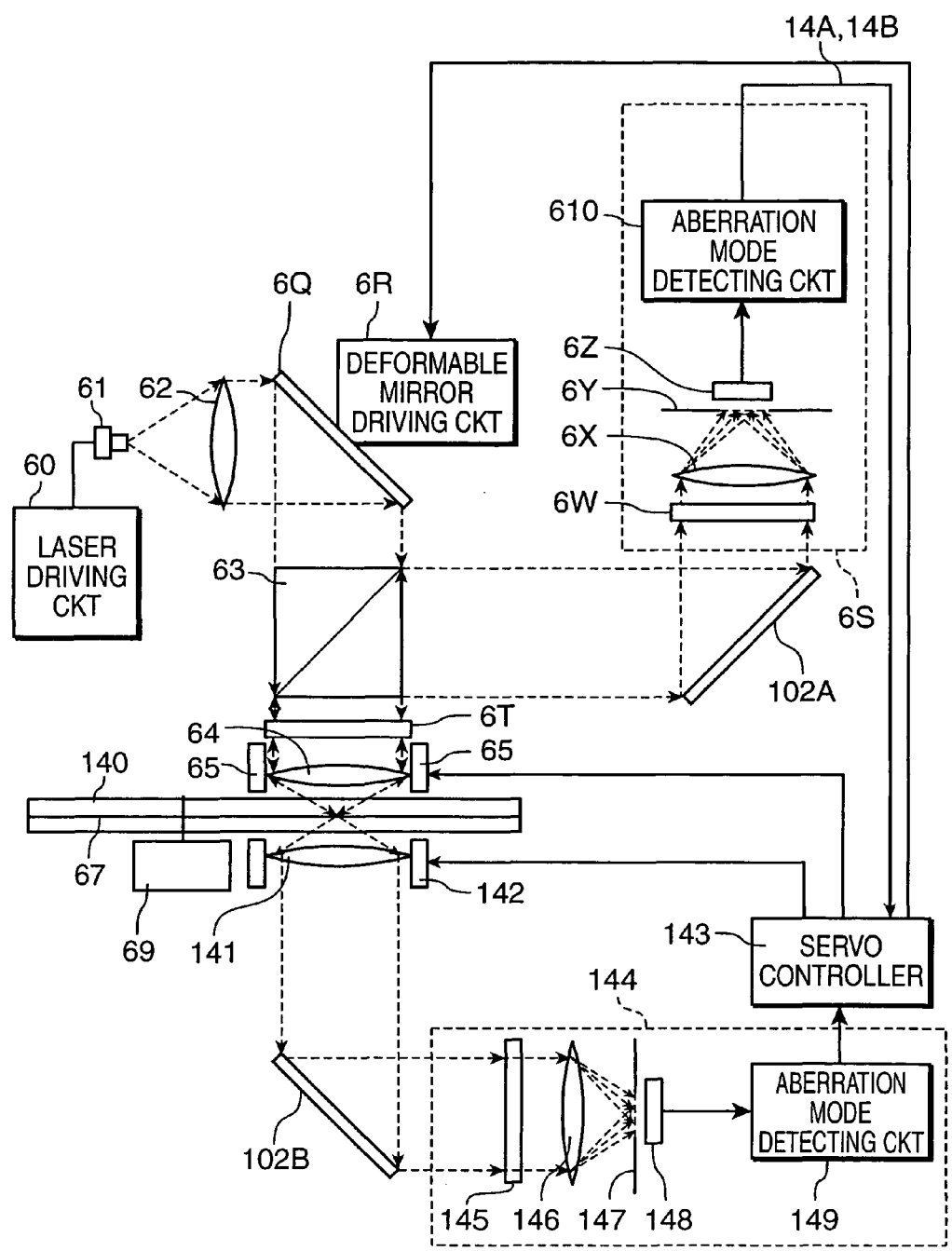
FIG. 13 is an illustration showing an arrangement of an optical disk apparatus in the fifth embodiment.

FIG. 13 is an illustration showing an arrangement of an optical disk apparatus in the fifth embodiment. FIG. 13 shows the optical disk apparatus to which a technique of detecting tilt of an optical disk using a transmitted beam is applied. An optical disk 140 is similar to the optical disk 66 shown in FIG. 3 except that a reflecting layer corresponding to the reflecting layer 68 is not formed, and that a laser beam propagates through a recording layer stack 67 and goes out of the surface of the optical disk 140 opposite to the laser beam incident surface where the laser beam is incident.

Since a laser pointer 61, a laser driving circuit 60, a collimator lens 62, a deformable mirror 6Q, a deflecting beam splitter 63, a quarter (¼) wavelength plate 6T, an objective lens 64, and an objective lens actuator 65 shown in FIG. 13 have the same arrangements as those of the corresponding ones in FIG. 3, description thereof is omitted herein.

A part of the laser beam focused on a target recording layer in the recording layer stack 67 propagates through the recording layer stack 67, and goes out of the surface of the optical disk 140 opposite to the laser beam incident surface.

The other part of the laser beam focused on the target recording layer in the recording layer stack 67 is reflected thereon and is returned to the objective lens 64. The laser beam which has returned to the objective lens 64 propagates through the objective lens 64 and the quarter wavelength plate 6T, is reflected from the deflecting beam splitter 63 in a direction different from the direction of the incoming beam, and is incident onto the interior of an even symmetrical aberration sensor 6S.

The laser beam which is reflected from a plane mirror 102A and is incident onto the even symmetrical aberration sensor 6S is incident onto a hologram 6W. Four kinds of bias aberrations, namely, two kinds of bias defocus aberrations which are different in sign and identical in size, and two kinds of bias spherical aberrations which are different in sign and identical in size are added to the incident laser beam in the hologram 6W. The aberration amounts of the respective bias aberrations are determined by the detected aberration amounts, and preferably set to about half of the respective detected aberration amounts.

The laser beam added with the respective bias aberrations in the hologram 6W is incident onto a condenser lens 6X. The position of the condenser lens 6X is adjusted in such a manner that a laser beam from the focusing spot of the objective lens 64 is focused on a pinhole plate 6Y.

The laser beam incident onto the condenser lens 6X is focused on the pinhole plate 6Y. Four pinholes are formed in the pinhole plate 6Y in correspondence to the number of the added bias aberrations in the hologram 6W. The radius of each of the pinholes is for instance 1/1.22 times as large as the radius of an airy disk.

The laser beams that have passed through the pinholes in the pinhole plate 6Y are incident onto photo-sensors of a photo-sensor array 6Z arrayed in correspondence to the pinholes, respectively. The laser beams incident onto the respective photo-sensors are converted into electrical signals, which are outputted to an aberration mode detecting circuit 610. The aberration mode detecting circuit 610 differentially amplifies a signal from each of the photo-sensors with respect to each of the aberration modes, and outputs, to a servo controller 143, a differentially amplified defocus aberration detection signal 14A and a differentially amplified spherical aberration detection signal 14B. The servo controller 143 controls a deformable mirror driving circuit 6R for driving the deformable mirror 6Q and the objective lens actuator 65 for driving the objective lens 64 based on the value of the defocus aberration detection signal 14A and on the value of the spherical aberration detection signal 14B.

The laser beam which has passed through the optical disk 140 is incident onto a transmitting-side objective lens 141. The servo controller 143 controls the objective lens 64 and the transmitting-side objective lens 141 in such a manner that the focusing spot of the objective lens 64 and the focal point of the transmitting-side objective lens 141 are coincident with each other. In this arrangement, the transmitting-side objective lens 141 converts a laser beam incident onto the transmitting-side objective lens 141 into parallel rays.

The laser beam going out from the transmitting-side objective lens 141 is reflected from a plane mirror 102B and is incident onto a tilt sensor 144. The laser beam incident onto the tilt sensor 144 is incident onto a hologram 145. Ten kinds of bias aberrations, namely, two kinds of bias defocus aberrations which are different in sign and identical in size, two kinds of bias X tilt aberrations which are different in sign and identical in size, two kinds of bias Y tilt aberrations which are different in sign and identical in size, two kinds of bias 0-degree astigmatisms which are different in sign and identical in size, and two kinds of bias 45-degree astigmatism which are different in sign and identical in size, are added to the incident laser beam in the hologram 145. The aberration amounts of the respective bias aberrations are determined by the detected aberration amounts, and preferably set to about half of the respective detected aberration amounts.

The laser beam added with the respective bias aberrations in the hologram 145 is incident onto a condenser lens 146. The position of the condenser lens 146 is adjusted in such a manner that the laser beam from the focusing spots of the objective lens 64 and of the condenser lens 146 is focused on a pinhole plate 147.

The laser beam incident onto the condenser lens 146 is focused on the pinhole plate 147. Ten pinholes are formed in the pinhole plate 147 in correspondence to the number of the added bias aberrations in the hologram 145. The radius of each of the pinholes is for instance 1/1.22 times as large as the radius of an airy disk.

The laser beams that have passed through the pinhole plate 147 are incident onto photo-sensors of a photo-sensor array 148 arrayed in correspondence to the pinholes, respectively. The laser beams incident onto the respective photo-sensors are converted into electrical signals, which are outputted to an aberration mode detecting circuit 149. The aberration mode detecting circuit 149 differentially amplifies a signal from each of the photo-sensors with respect to each of the aberration modes, and outputs, to the servo controller 143, five different detection signals, namely, a differentially amplified defocus aberration detection signal, a differentially amplified X-tilt detection signal, a differentially amplified Y-tilt detection signal, a differentially amplified 0-degree astigmatism detection signal, and a differentially amplified 45-degree astigmatism detection signal.

The optical axes of the objective lens 64 and of the transmitting-side objective lens 141 are coincident with each other when the 0-degree astigmatism and the 45-degree astigmatism are minimized. Also, the focusing spots of the objective lens 64 and of the transmitting-side objective lens 141 are coincident with each other when the defocus aberration is minimized. In this arrangement, the servo controller 143 controls the position of the transmitting-side objective lens 141 by way of a transmitting-side objective lens actuator 142 in such a manner that the 0-degree astigmatism detection signal and the 45-degree astigmatism detection signal are minimized. Thereby, the optical axes of the objective lens 64 and of the transmitting-side objective lens 141 are made coincident with each other. Further, the servo controller 143 controls the position of the transmitting-side objective lens 141 by way of the transmitting-side objective lens actuator 142 in such a manner that the defocus aberration detection signal is minimized. Thereby, the focusing spots of the objective lens 64 and of the transmitting-side objective lens 141 are made coincident with each other.

Tilt of the optical disk 140 in the X-direction and in the Y-direction can be detected based on the X-tilt detection signal and on the Y-tilt detection signal which are obtained when the 0-degree astigmatism detection signal, the 45-degree astigmatism detection signal, and the defocus aberration detection signal are minimized. The servo controller 143 controls the objective lens actuator 65 and the transmitting-side objective lens actuator 142 based on the X-tilt detection signal and on the Y-tilt detection signal to tilt the objective lens 64 and the transmitting-side objective lens 141 for canceling tilt of the optical disk 140.

In the optical disk apparatus as mentioned above in this embodiment, part of the laser beam irradiated on the recording layer is allowed to pass, and to go out of the surface of the optical disk opposite to the laser beam incident surface. Further, tilt of the wavefront of the laser beam which goes out of the surface of the optical disk opposite to the laser beam incident surface is detected. This arrangement enables to perform tilt detection of the optical disk with a high precision.

Sixth Embodiment

Now, a sixth embodiment of the invention is described referring to the drawings.

In the sixth embodiment, tilt of an optical disk is detected with a high detection sensitivity, as compared with the second embodiment, by allowing a laser beam of a small numerical aperture (hereinafter, called as "NA") to disperse on a dispersant and by allowing an objective lens of a large NA to receive the dispersed beams.

Figure 14A:
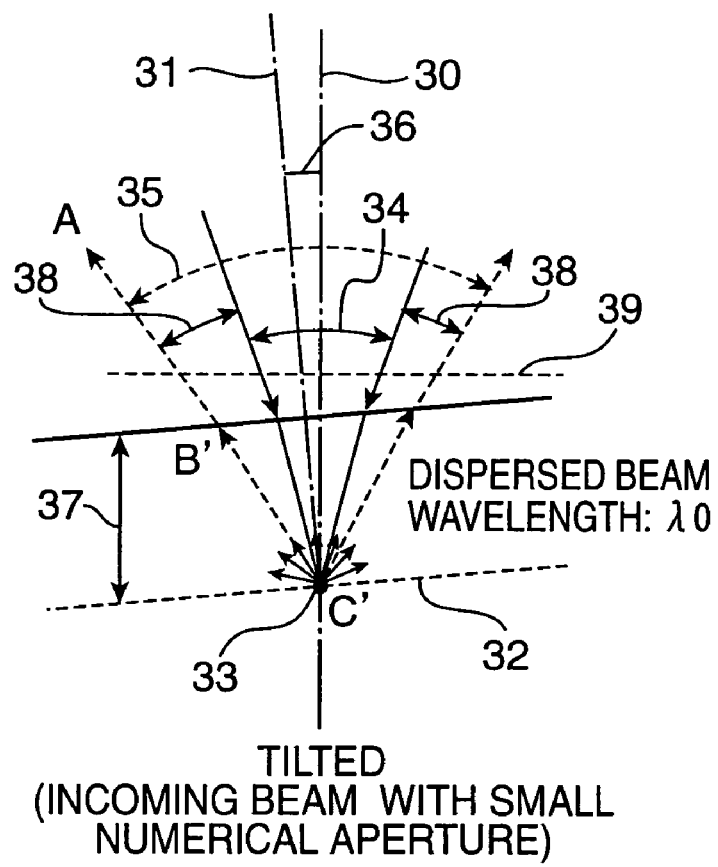
FIGS. 14A and 14B are illustrations for explaining a principle of tilt detection in a sixth embodiment of the invention.
Figure 14B:
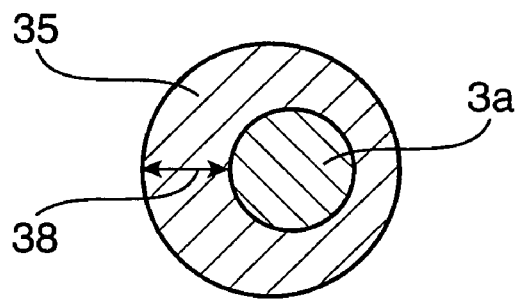

FIGS. 14A and 14B are illustrations for explaining a principle of tilt detection in the sixth embodiment. FIG. 14A shows a cross section of an optical disk, and FIG. 14B shows an incoming beam and an outgoing beam viewed from an optical axis direction of the optical disk with respect to a plane 39 orthogonal to an optical axis 30 in FIG. 14A. Although FIG. 14A shows an example that the optical disk has a single recording layer for sake of easy explanation, the same principle is applied to a case that an optical disk has plural recording layers.

In FIG. 14A, the optical axis 30 of the laser beam is tilted with respect to a normal line 31 to a recording layer 32 by a certain angle 36. The angle 36 corresponds to a tilt angle. A laser beam of a wavelength $\lambda_0$ that is incident through a base member 37 is dispersed on a dispersing part 33 of the recording layer 32, and is irradiated as dispersed beams each having a wavelength $\lambda_0$. An incoming optical path 34 of the incoming beam has a small numerical aperture (NA), and the incoming beam is focused on the recording layer 32. The incoming beam in the incoming optical path 34 is dispersed on the dispersant 33 on the recording layer 32, and the dispersed beams are irradiated with a large angle with respect to the normal line 31 to the recording layer 32. In this arrangement, when the optical disk apparatus receives a dispersed beam having a larger NA than the incoming beam, the dispersed beam on an aperture area, namely, the reflected beam in an outgoing optical path 35 of the outgoing beam which is not overlapped with the incoming optical path 34 is free from cancellation of aberration by tilt. The aperture area corresponds to an optical path 38 free from cancellation of aberration in FIG. 14A, namely, substantially corresponds to an outer annular zone or an orbicular zone of the outgoing optical path 35. In FIG. 14B, an optical path 3a, which is the overlapped portion of the incoming optical path 34 having a small NA and the outgoing optical path 35, is located in the center, and the outgoing optical path 35 constituting part of the dispersed beams is distributed in a wide area around the central optical path 3a including the central optical path 3a. The optical path 35 corresponds to the aberration-cancellation-free aperture area or the outer annular zone of the optical path 38. In this arrangement, tilt of the optical disk can be detected by using the optical path 35.

Figure 15:
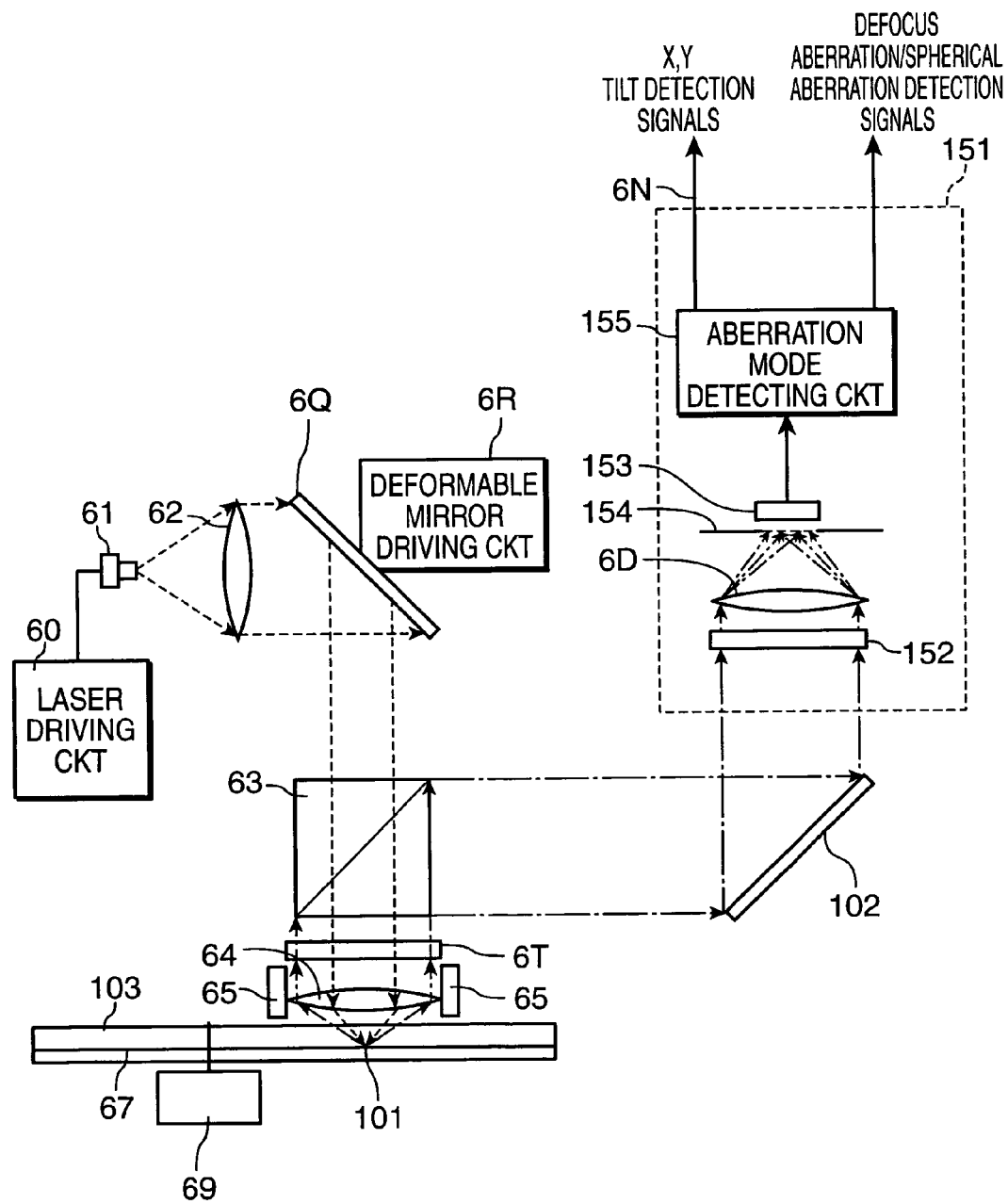
FIG. 15 is an illustration showing an arrangement of an optical disk apparatus in the sixth embodiment.

FIG. 15 is an illustration showing an arrangement of an optical disk apparatus in the sixth embodiment. Since the arrangement of the sixth embodiment is substantially the same as that of the second embodiment, description on the same parts as those in the second embodiment is omitted herein. The sixth embodiment is different from the second embodiment in the operation of the deformable mirror 6Q and in the function of the hologram 104.

During recording or reproducing (hereinafter, called as "recording/reproducing mode"), the deformable mirror 6Q is driven to add spherical aberration to a light component introduced through a collimator lens 62 so as to cancel spherical aberration which is added until the incoming beam is focused on the recording layer. Also, the deformable mirror 6Q is driven to irradiate a laser beam of a small NA onto a dispersing part 101 while excluding the outer annular zone of the outgoing optical path 35 cyclically or at a predetermined timing. Hereinafter, this operation is called as "tilt detection mode". Preferably, the NA at the recording/reproducing mode is not smaller than 0.6 and not larger than 0.85. Preferably, the NA at the tilt detection mode wherein the laser beam is incident onto the dispersing part 101 excluding the outer annular zone is not smaller than 0.1 and not larger than 0.2.

The laser beam of a small NA without incidence onto the outer annular zone by the driving of the deformable mirror 6Q, namely, the incoming beam is passed through a deflecting beam splitter 63, a quarter wavelength plate 6T, and an objective lens 64, and is focused on a target recording layer in the optical disk 103. The dispersing part 101 is formed on the recording layer, and dispersed beams are generated on the dispersing part 101 when the laser beam is focused on the dispersing part 101. Tilt detection is performed by using the light component received on the objective lens 64 within the dispersed beams. This light component is called as an outgoing beam. In this arrangement, the NA of the outgoing beam is larger than the NA of the incoming beam. Preferably, the NA of the outgoing beam is 0.6 or more.

Referring to FIG. 15, the outgoing beam is represented by the one-dotted-chain line. The outgoing beam is passed through the objective lens 64, and the quarter wavelength plate 6T, is reflected from the deflecting beam splitter 63, is reflected from a mirror 102, and is incident onto a tilt sensor 151.

The tilt sensor 151 is a modal sensor of the same kind as the tilt sensor 108 in the second embodiment shown in FIG. 8. The sixth embodiment is different from the second embodiment in that all the light components shown by the one-dotted-chain line in FIG. 15 are not used for tilt detection, and that light components corresponding to the aberration-cancellation-free area 38 shown in FIGS. 14A and 14B is used. As is obvious from FIGS. 14A and 14B, substantially all the light components in the area 38 constitute dispersed beams. Accordingly, the area 38 is free from an influence of a non-dispersed beam, and a high S/N ratio is obtained even from a dispersed beam of a small intensity. Also, in a normal state of use, namely, in the recording/reproducing mode, defocus aberration and spherical aberration are detected.

The outgoing beam incident onto the tilt sensor 151 is incident onto a hologram 152. The hologram 152 is divided into two sections. One is an outer annular section of the hologram 152 corresponding to the aberration-cancellation-free area 38 in FIG. 14B, in which bias coma aberrations of plus sign and minus sign are applied to detect tilt of the optical disk in two directions, namely, X-direction and Y-direction. The other is a central section of the hologram 152 corresponding to the central area 3a in FIG. 14B where the incoming optical path 34 and the outgoing optical path 35 are overlapped, in which bias defocus aberrations of plus sign and minus sign, and bias spherical aberrations of plus sign and minus sign are applied.

The outgoing beams added with the respective bias aberrations in the hologram 152 are passed through a condenser lens 6D, and are focused on pinholes formed in a pinhole plate 154. The beams that have passed through the pinhole plate 154 are incident onto photo-sensors of a photo-sensor array 153 arrayed in correspondence to the pinholes, respectively. Detection signals in correspondence to the respective photo-sensors are sent from the photo-sensor array 153 to an aberration mode detecting circuit 155. The aberration mode detecting circuit 155 generates differentially amplified detection signals, wherein the respective bias aberrations of plus sign and minus sign in pair are added, and outputs X-, Y-tilt detection signals, a defocus detection signal, and a spherical aberration detection signal.

In the sixth embodiment, in addition to the effect resulting from detecting tilt without cancellation of aberration in the outgoing beam by randomizing the phase of the incoming beam due to dispersion as shown in the second embodiment, the influence of the phase of the incoming beam can be further reduced by using the incoming beam of a smaller NA than the outgoing beam, thereby raising the precision in tilt detection using the outgoing beam. Also, the outer annular zone exclusively including the dispersed beams is used for tilt detection. This arrangement enables to raise the S/N ratio, thereby raising the precision in tilt detection using the outgoing beam.

Further, in the sixth embodiment, a single laser beam is switchingly used between the tilt detection mode and the recording/reproducing mode by using the deformable mirror 6Q in a time sequential manner. This arrangement enables to simplify the arrangement of the optical disk apparatus, as compared with the second embodiment.

The optical disk used in the sixth embodiment may be formed with the recording layers and the dispersing layer, as shown in FIG. 9. In such an altered arrangement, the deformable mirror 6Q not only changes the numerical aperture but also changes the focus position in switching over the mode, thereby switching over the focusing beam onto the recording layers and the dispersing layer. In this arrangement, aberration detection and recording/reproducing are executable with use of a single beam, and the timing for irradiating a laser beam onto the dispersing part can be arbitrarily set by the optical disk apparatus. This arrangement facilitates optimization regarding tradeoff between the precision in aberration detection and a transfer speed in optical disk recording/reproducing. For instance, in the case where the tilt angle of the optical disk is small, it is possible to lower the frequency of aberration detection.

Alternatively, a dispersing part may not be formed in the optical disk. For instance, when the apparatus is in the tilt detection mode having a small NA, the reflecting surface of an ordinary optical disk has dispersability capable of dispersing part of an incident beam toward an outer annular zone. In this case, since a laser beam is incident with a small numerical aperture, the diameter of the beam spot of the laser beam on the recording layer is increased. As a result, the recording mark itself within the beam spot is equivalently functioned as dispersing particles, thereby securing sufficiently high dispersability.

In the foregoing, described is the case that the optical disk is used. The invention, however, is widely applicable to recording media capable of recording information or reproducing information through laser irradiation, and to an apparatus and a method for controlling recording/reproducing.

An optical disk apparatus according to an aspect of the invention comprises: a light source which irradiates a laser beam onto a recording layer of an optical disk by way of a disk base member to form a focusing spot on the recording layer, a photo detector which receives a reflected beam on the reflecting layer; and a tilt detecting means which detects tilt of the optical disk by using an output from the photo detector. The optical disk has the transparent planar disk base member, the recording layer formed on the disk base member, and a reflecting layer in a certain positional relation to the recording layer.

The above arrangement enables to prevent lowering of detection sensitivity in tilt aberration due to offset of aberration of the laser beam between the incoming beam and the outgoing beam, thereby enabling to perform tilt detection of a high precision. Also, this arrangement enables to detect tilt of the optical disk without forming a groove or a pit in the recording layer of the optical disk, which effectively suppresses lowering of the light amount to be received on the optical disk due to diffraction or dispersion of the laser beam on a recording layer other than the target recording layer in multilayer recording where recording is executed with respect to multiple recording layers.

Preferably, the recording layer may be formed closer to an incident surface of the optical disk where the laser beam is incident than the reflecting layer. In this arrangement, part of the laser beam that has passed through the recording layer is reflected from the reflecting layer, and tilt detection is performed by using the laser beam reflected from the reflecting layer. This arrangement enables to perform tilt detection while reproducing information recorded on the recording layer, or recording information onto the recording layer.

Preferably, the optical disk apparatus may further comprise an aberration canceling means (i.e. an aberration cancelling unit) which is formed on an optical path for guiding the reflected beam to the photo detector to cancel a defocus aberration and a spherical aberration of the reflected beam.

In the above arrangement, since the defocus aberration and the spherical aberration in the reflected beam are cancelled, a clear beam spot having a high Strehl ratio is obtained, and a detection output of a high S/N ratio is obtained, thereby enabling to improve precision in tilt detection.

Preferably, the aberration canceling means may include a wavefront controlling device which controls a wavefront of the reflected beam. In this arrangement, since the wavefront controlling device arbitrarily changes the wavefront of the reflected beam, the spherical aberration in the reflected beam can be cancelled with a simplified arrangement.

Preferably, the aberration canceling means may include a condenser lens which focuses the reflected beam on the photo detector, and a lens moving means which moves the condenser lens.

In the above arrangement, since the condenser lens is moved by the lens moving means, the defocus aberration can be cancelled by changing the position of the condenser lens, thereby enabling to improve precision in tilt detection.

An optical disk according to an aspect of the invention comprises: a transparent planar disk base member; a recording layer which is formed on the disk base member; and a reflecting layer which reflects an incident laser beam by way of the disk base member, wherein the reflecting layer is formed at a position opposing the disk base member with respect to the recording layer, and a gap between the recording layer and the reflecting layer is set larger than a wavelength of the laser beam.

In the above arrangement, since the tilt aberration or the coma aberration is included in the laser beam reflected from the reflecting layer without cancellation, tilt detection can be performed by using the tilt aberration or the coma aberration.

Preferably, the recording layer may be made of a photoisomerizing material having a property that two-photon absorption occurs by irradiation of the laser beam. In this arrangement, merely the refractive index of the focusing spot of the laser beam on the recording layer made of the photoisomerizing material can be changed by utilizing the two-photon absorption. This arrangement enables to select a target recording layer on which recording is intended to be performed by controlling the focal point of the laser beam in the depthwise direction of the multilayer optical disk.

An optical disk apparatus according to another aspect of the invention comprises: a light source which irradiates a laser beam onto a dispersing part of an optical disk by way of a disk base member to form a focusing spot on the dispersing part, the optical disk having the transparent planar disk base member, a recording layer formed on the disk base member, and the dispersing part which randomizes at least a part of a phase of the laser beam incident by way of the disk base member; a photo detector which receives a dispersed beam dispersed on the dispersing part; and a tilt detecting means which detects tilt of the optical disk by using an output from the photo detector. This arrangement enables to prevent lowering of detection sensitivity in tilt aberration due to offset of aberration of the laser beam between the incoming beam and the outgoing beam, thereby enabling to perform tilt detection of a high precision.

Preferably, the light source may include a first light source unit which generates a first laser beam to form a first focusing spot on an information recording section on the recording layer by focusing the first laser beam onto the information recording section, and a second light source unit which generates a second laser beam having a wavelength different from a wavelength of the first laser beam to form a second focusing spot on the dispersing part by focusing the second laser beam onto the dispersing part, wherein the photo detector includes a first detecting unit which receives the first laser beam reflected from the first focusing spot, and a second detecting unit which receives the second laser beam reflected from the second focusing spot, and the tilt detecting means detects the tilt of the optical disk by using an output from the second detecting unit. The optical disk apparatus may further comprise a recorded information detecting means which detects information recorded on the recording layer by using an output from the first detecting unit.

In the above arrangement, since the first laser beam for detecting information recorded on the recording layer, and the second laser beam for performing tilt detection are individually irradiated, readout of the information recorded on the recording layer, and tilt detection can be performed simultaneously.

An optical disk according to yet another aspect of the invention comprises: a transparent planar disk base member; a recording layer which is formed on the disk base member; and a dispersing part which randomizes at least a part of a phase of a laser beam incident by way of the disk base member.

In the above arrangement, the dispersing part randomizes the phase of the wavefront including the aberration generated in the incoming optical path of the laser beam, and tilt of the optical disk is detected by using the reflected beam from the dispersing part. When the laser beam is dispersed, the dispersed beam has no or less correlation to the laser beam before the dispersion, namely, the wavefront of the incoming beam. Accordingly, the light component after the dispersion, namely, the aberration in the outgoing beam is added, and the tilt aberration or the coma aberration is not cancelled. This corresponds to a behavior of light, wherein a point source of light is newly formed in the center of dispersion. In this way, since the tilt aberration or the coma aberration is included in the dispersed beam dispersed on the dispersing part without cancellation, tilt detection can be performed by using the tilt aberration or the coma aberration.

Preferably, the dispersing part may be formed on the recording layer. In this arrangement, since the dispersing part is formed on the recording layer, the laser beam can be dispersed on the dispersing part by focusing the laser beam on the dispersing part of the recording layer.

Preferably, the dispersing part may include a servo mark formed on the recording layer. This arrangement enables to disperse the laser beam by using the servo mark on the recording layer without forming the dispersing part for dispersing the laser beam on the recording layer.

Preferably, the dispersing part may be formed on a layer different from the recording layer. In this arrangement, since the dispersing part is formed on the layer different from the recording layer, as compared with an arrangement that the dispersing part is formed in the recording layer, production of the optical disk is easy. Also, this arrangement enables to utilize the entire surface of the recording layer as a surface for recording information, and aberration detection can be carried out continuously.

Preferably, the dispersing part includes at least one of a recess and a protrusion formed on a surface thereof to diffusingly reflect the laser beam on the surface of the dispersing part. This arrangement enables to diffusingly reflect the laser beam from the dispersing part having at least one of the micro recess or the micro protrusion on the surface of the dispersing part.

Preferably, the depth of the recess or the height of the protrusion may be a half wavelength of the laser beam or more. This arrangement enables to efficiently and diffusingly reflect the laser beam.

Preferably, the dispersing part may be made of a medium having transmittance to the laser beam, and may be formed by dispersing dispersants capable of reflecting the laser beam in the medium from a surface of the medium to a depth thereof corresponding to a half wavelength of the laser beam or more.

In the above arrangement, the phase of the incident laser beam is randomized when the incident laser beam is reflected from the dispersants located at various depth positions, and the tilt aberration or the coma aberration is included in the phase-randomized laser beam without cancellation. This arrangement enables to perform tilt detection by using the tilt aberration or the coma aberration.

Preferably, the dispersants may be formed by modifying the medium by selectively giving an energy larger than an energy of the laser beam to the medium. This arrangement enables to form the dispersants by modifying a moiety of the medium by selectively giving the energy higher than the energy of the laser beam to the medium.

Preferably, the dispersants may be formed by dispersing absorbents serving as nuclei of the dispersants into the medium, and by allowing the absorbents to selectively absorb an energy of the laser beam to grow the nuclei.

The above arrangement enables to form the dispersants by dispersing the absorbents serving as the nuclei of the dispersants into the medium, and by allowing the absorbents to selectively absorb the energy of the laser beam to grow the nuclei.

Preferably, the dispersing part may disperse a beam having a wavelength different from the wavelength of the laser beam. In this arrangement, the beam having the wavelength different from the laser beam wavelength is irradiated by absorbing the energy of the laser beam. As a result, the incoming beam has no or less correlation to the wavefront of the incident laser beam, and the aberration of the outgoing beam is added. Thus, the tilt aberration or the coma aberration is included in the outgoing beam without cancellation, and tilt detection can be performed by using the tilt aberration or the coma aberration.

Preferably, the dispersed beam having the wavelength different from the laser beam wavelength may include a fluorescence. In this arrangement, a portion where the fluorescence having the wavelength different from the laser beam wavelength is emitted by absorbing the energy of the laser beam focused on the recording layer is formed on the recording layer, and tilt of the recording layer where the laser beam is focused is detected by using the fluorescence. When the fluorescence on the fluorescent portion of the recording layer is emitted by absorbing the energy of the laser beam, the fluorescence has no or less correlation to the incoming beam, namely, the wavefront of the incident laser beam, and the aberration of the light after the emission of the fluorescence, namely, the aberration of the outgoing beam is added. As a result, tilt aberration or coma aberration is not cancelled. In this sense, the fluorescent portion on the recording layer where the fluorescence is emitted is one of the modifications of the dispersing part.

An optical disk apparatus according to yet another aspect of the invention comprises: a light source which irradiates a laser beam onto a recording layer of an optical disk by way of a disk base member, the optical disk having the transparent planar disk base member, and the recording layer formed on the disk base member; a photo detector which receives a reflected beam from the optical disk; an incoming beam optical system which allows the laser beam irradiated from the light source to be incident onto the optical disk with a first numerical aperture; an outgoing beam optical system which allows the reflected beam from the optical disk to be received on the photo detector with a second numerical aperture larger than the first numerical aperture to guide the reflected beam to the photo detector; and a tilt detecting means which detects tilt of the optical disk by using an output from the photo detector.

In the above arrangement, an influence of the phase of the incoming beam can be lessened by using, as the incoming beam, the laser beam of the numerical aperture smaller than the numerical aperture of the outgoing beam, thereby enabling to raise the precision in tilt detection using the outgoing beam. Also, since the outer annular zone where the dispersed beam is exclusively included is used for tilt detection, a high S/N ratio can be obtained, thereby enabling to raise the precision in tilt detection using the outgoing beam.

Preferably, the first numerical aperture may be 0.2 or smaller, and the second numerical aperture may be 0.6 or larger.

The above arrangement enables to set the numerical aperture of the incoming beam smaller than the numerical aperture of the outgoing beam. Further, the precision in tilt detection using the outgoing beam can be raised by setting the numerical aperture of the incoming beam to 0.2 or smaller and by setting the numerical aperture of the outgoing beam to 0.6 or larger.

Preferably, the optical disk may include a dispersing part which randomizes at least a part of a phase of the reflected beam. In this arrangement, the aberration detection and the recording/reproducing can be executed with use of a single laser beam, and the timing of irradiating the laser beam onto the dispersing part can be arbitrarily set by the apparatus. This arrangement facilitates optimization regarding tradeoff between the precision in aberration detection and a transfer speed in optical disk recording/reproducing.

Preferably, the optical disk apparatus may further comprise: a mode switching means which switches over an operation mode of the optical disk apparatus in a time-sharing manner between a recording/reproducing mode of performing at least one of recording information on and reproducing information from an information recording section on the recording layer by focusing the laser beam irradiated from the light source onto the information recording section, and a tilt detecting mode of detecting the tilt of the optical disk by focusing the laser beam irradiated from the light source onto the dispersing part; and a numerical aperture switching means which switches over the numerical aperture of the laser beam to be incident onto the optical disk between the first numerical aperture and the second numerical aperture, wherein the numerical aperture switching means sets the numerical aperture of the laser beam to the first numerical aperture in response to setting of the operation mode of the apparatus to the tilt detection mode by the mode switching means, and sets the numerical aperture of the laser beam to the second numerical aperture in response to setting of the operation mode of the apparatus to the recording/reproducing mode by the mode switching means.

In the above arrangement, since the tilt detection mode and the recording/reproducing mode are switched over in a time-series manner by the numerical aperture switching means (deformable mirror 6Q) with use of the single laser beam, the arrangement of the optical disk apparatus can be simplified. The deformable mirror 6Q in the sixth embodiment corresponds to an example of the numerical aperture switching means.

Preferably, the outgoing beam optical system may guide, to the photo detector, the reflected beam from the optical disk which lies in an outer annular zone of an outgoing optical path and has a numerical aperture larger than the first numerical aperture and not larger than the second numerical aperture.

In the above arrangement, tilt detection can be performed because the beam in the outer annular zone having the numerical aperture larger than the first numerical aperture and not larger than the second numerical aperture is guided to the photo detector, and the aberration is included in the beam in the outer annular zone.

An optical disk apparatus according to yet another aspect of the invention comprises: a light source which irradiates a laser beam onto a recording layer of an optical disk by way of a disk base member to form a focusing spot on the recording layer, the optical disk having the transparent planar disk base member, and the recording layer formed on the disk base member; a wavefront controlling device which controls a wavefront of the laser beam irradiated onto the recording layer; a photo detector which receives a reflected beam from the recording layer, the wavefront controlling device time-sharingly controlling the wavefront of the laser beam irradiated onto the recording layer in such a manner that a defocus aberration of a predetermined amount or a spherical aberration of a predetermined amount is included; and a tilt detecting means which detects tilt of the optical disk by detecting a tilt aberration or a coma aberration included in the reflected beam by using an output from the photo detector.

In the above arrangement, since the defocus aberration of a certain amount and the spherical aberration of a certain amount are included in the wavefront of the laser beam irradiated onto the recording layer, the tilt aberration or the coma aberration, which represents the tilt of the recording layer, can be detected by using the reflected beam even if the recording layer is flat. This arrangement enables to perform tilt detection of a high precision. The deformable mirror 6Q in the fourth embodiment corresponds to an example of the wavefront controlling device.

Preferably, the optical disk apparatus may further comprise an aberration canceling means which is formed on an optical path for guiding the reflected beam reflected from the recording layer to the photo detector to cancel a defocus aberration and a spherical aberration of the reflected beam.

In the above arrangement, since the defocus aberration and the spherical aberration in the reflected beam are cancelled, merely the aberration necessary for tilt detection e.g. tilt aberration or coma aberration can be detected. The deformable mirror 6A in the fourth embodiment corresponds to an example of the aberration canceling means.

An optical disk apparatus according to yet another aspect of the invention is adapted to perform at least one of recording information on a recording layer of an optical disk, and reproducing information from the recording layer. The apparatus comprises: a light source which irradiates a laser beam onto the recording layer by way of a disk base member, the optical disk having the transparent planar disk base member, and the recording layer formed on the disk base member, the optical disk being so configured as to pass at least a part of the laser beam irradiated from the light source; a photo detector which receives the laser beam that has passed through the optical disk; and a tilt detecting means which detects tilt of the optical disk by using an output from the photo detector.

In the above arrangement, since the tilt aberration and the coma aberration of the transmitted laser beam are not cancelled, tilt of the optical disk can be detected by detecting the tilt aberration and the coma aberration of the transmitted laser beam.

An optical disk according to still another aspect of the invention comprises: a first transparent planar disk base member; a second disk base member; and a recording layer which is formed between the first disk base member and the second disk base member, the recording layer being so configured as to pass at least a part of a laser beam that has been irradiated through the first disk base member through the second disk base member.

In the above arrangement, since at least the part of the laser beam irradiated onto the optical disk is passed through the recording layer, tilt of the optical disk can be detected by detecting the tilt aberration and the coma aberration of the transmitted laser beam.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

The optical disk (optical disk-like information recording medium) according to the invention is useful in recording or reproducing digital data, and is useful in an optical disk apparatus for performing at least one of recording information on a recording layer of the optical disk, and reproducing information from the recording layer.

The invention claimed is:

1. An optical disk apparatus for recording or reproducing information on or from an optical disk which has a transparent planar disk base member, a recording layer formed on the disk base member, and a reflecting layer for reflecting a laser beam by way of the disk base member, the reflecting layer being disposed on an opposite side of the disk base member than the recording layer, and the optical disk being configured such that an interval between the recording layer and the reflecting layer is longer than a wavelength of the laser beam, said optical disk apparatus comprising:

a light source which irradiates the laser beam for recording or reproducing the information on or from the optical disk, wherein said light source irradiates the laser beam onto the recording layer of the optical disk by way of the disk base member to form a focusing spot on the recording layer;

a photo detector which receives from the reflecting layer a reflected beam of the laser beam irradiated from said light source;

a tilt detecting unit which detects tilt of the optical disk by using an output from said photo detector;

a beam splitter which splits the reflected beam and the laser beam incident onto the optical disk such that the reflected beam and the laser beam incident onto the optical disk propagate along different optical paths from each other;

an objective lens which focuses the laser beam split by the beam splitter onto the recording layer of the optical disk;

an objective lens actuator which moves the objective lens to focus the laser beam onto the recording layer of the optical disk;

an aberration canceling unit which is disposed on an optical path for guiding the reflected beam to the photo detector to cancel a defocus aberration and a spherical aberration of the reflected beam split by the beam splitter, and wherein the aberration canceling unit includes a condenser lens which focuses the reflected beam on the photo detector and a condenser lens actuator which moves the condenser lens to cancel the aberration of the reflected beam.

2. The optical disk apparatus according to claim 1, wherein the recording layer is formed closer to an incident surface of the optical disk where the laser beam is incident than the reflecting layer.

3. The optical disk apparatus according to claim 1, wherein said aberration canceling unit includes a wavefront controlling device which controls a wavefront of the reflected beam.

4. The optical disk apparatus of claim 1, wherein said light source irradiates the laser beam such that the laser beam is incident on the recording layer.

5. The optical disk apparatus of claim 1, wherein said photo detector generates the output based on the reflected beam.

6. The optical disk apparatus of claim 1, wherein said optical disk apparatus is operable to detect tilt of the optical disk based on a length of an optical path of the laser beam.

7. The optical disk apparatus of claim 1, wherein said beam splitter is disposed upstream of said aberration canceling unit along the optical path of the reflected beam such that movement of the condenser lens actuator does not affect the laser beam incident on the optical disk.

8. A system comprising an optical disk and an optical disk apparatus for recording or reproducing information on or from the optical disk,
wherein the optical disk has a transparent planar disk base member, a recording layer formed on the disk base member, and a reflecting layer for reflecting a laser beam by way of the disk base member, the reflecting layer being disposed on an opposite side of the disk base member than the recording layer, and the optical disk being configured such that an interval between the recording layer and the reflecting layer is longer than a wavelength of the laser beam, and
wherein said optical disk apparatus comprises:
(i) a light source which irradiates the laser beam for recording or reproducing the information on or from the optical disk, wherein said light source irradiates the laser beam onto the recording layer of the optical disk by way of the disk base member to form a focusing spot on the recording layer;
(ii) a photo detector which receives from the reflecting layer a reflected beam of the laser beam irradiated from said light source;
(iii) a tilt detecting unit which detects tilt of the optical disk by using an output from said photo detector;
(iv) a beam splitter which splits the reflected beam and the laser beam incident onto the optical disk such that the reflected beam and the laser beam incident onto the optical disk propagate along different optical paths from each other;
(v) an objective lens which focuses the laser beam split by the beam splitter onto the recording layer of the optical disk;
(vi) an objective lens actuator which moves the objective lens to focus the laser beam onto the recording layer of the optical disk; and
(vii) an aberration canceling unit which is disposed on an optical path for guiding the reflected beam to the photo detector to cancel a defocus aberration and a spherical aberration of the reflected beam split by the beam splitter, the aberration canceling unit including a condenser lens which focuses the reflected beam on the photo detector and a condenser lens actuator which moves the condenser lens to cancel the aberration of the reflected beam.

9. The optical disk apparatus according to claim 8, wherein the recording layer is formed closer to an incident surface of the optical disk where the laser beam is incident than the reflecting layer.

10. The optical disk apparatus according to claim 8, wherein said aberration canceling unit includes a wavefront controlling device which controls a wavefront of the reflected beam.

11. The optical disk apparatus of claim 8, wherein said light source irradiates the laser beam such that the laser beam is incident on the recording layer.

12. The optical disk apparatus of claim 8, wherein said photo detector generates the output based on the reflected beam.

13. The optical disk apparatus of claim 8, wherein said optical disk apparatus is operable to detect tilt of the optical disk based on a length of an optical path of the laser beam.

14. The optical disk apparatus of claim 8, wherein said beam splitter is disposed upstream of said aberration canceling unit along the optical path of the reflected beam such that movement of the condenser lens actuator does not affect the laser beam incident on the optical disk.

15. The optical disk according to claim 8, wherein the recording layer is made of a photoisomerizing material having a property that two-photon absorption occurs by irradiation of the laser beam.

\* \* \* \* \*